(12) United States Patent
Doerr et al.

(10) Patent No.: US 8,600,027 B1
(45) Date of Patent: Dec. 3, 2013

(54) SYSTEM AND METHOD FOR CONFERENCE CALLING

(76) Inventors: Gregory Joseph Doerr, Arlington Heights, IL (US); Timothy J. Reedy, Schaumburg, IL (US)

( * ) Notice: Subject to any disclaimer, the term of this patent is extended or adjusted under 35 U.S.C. 154(b) by 0 days.

(21) Appl. No.: 13/585,482

(22) Filed: Aug. 14, 2012

(51) Int. Cl.
*H04M 3/42* (2006.01)

(52) U.S. Cl.
USPC .................. 379/202.01; 379/203.01; 455/416

(58) Field of Classification Search
USPC ............. 379/202.01, 201.01, 203.01, 204.01; 455/416
See application file for complete search history.

(56) References Cited

U.S. PATENT DOCUMENTS

| | | | |
|---|---|---|---|
| 6,978,002 B1 | 12/2005 | Cope | |
| 7,031,700 B1 | 4/2006 | Weaver | |
| 7,050,557 B2 | 5/2006 | Creamer et al. | |
| 7,907,551 B2 | 3/2011 | Croy | |
| 8,112,071 B2 | 2/2012 | Joglekar | |
| 8,126,129 B1 | 2/2012 | McGuire | |
| 8,204,197 B2 | 6/2012 | Yap et al. | |
| 2003/0053612 A1* | 3/2003 | Henrikson et al. | 379/202.01 |
| 2005/0018826 A1* | 1/2005 | Benco et al. | 379/202.01 |
| 2005/0018827 A1 | 1/2005 | Himmel | |
| 2005/0238156 A1 | 10/2005 | Turner | |
| 2007/0106724 A1 | 5/2007 | Gorti | |
| 2007/0294120 A1 | 12/2007 | Berstis | |
| 2008/0013706 A1 | 1/2008 | Kelley | |
| 2008/0205616 A1 | 8/2008 | Teng | |
| 2008/0219426 A1 | 9/2008 | Lai | |
| 2010/0061538 A1 | 3/2010 | Coleman | |
| 2010/0208625 A1 | 8/2010 | Logan | |
| 2011/0075826 A1 | 3/2011 | Block | |
| 2011/0130131 A1 | 6/2011 | Hanson | |
| 2011/0135077 A1 | 6/2011 | Wengrovitz | |
| 2011/0165858 A1 | 7/2011 | Gisby | |
| 2011/0268262 A1 | 11/2011 | Jones | |
| 2012/0230484 A1* | 9/2012 | Kannappan et al. | 379/202.01 |

* cited by examiner

*Primary Examiner* — Thjuan K Addy
(74) *Attorney, Agent, or Firm* — Erickson Law Group, PC

(57) ABSTRACT

A system for conference calling having a memory having at least one user record associated with a system user, the user record having telephone number and an electronic address. A conference call request receiving function is executable by the processor to receive a conference call request email, the conference call request email has calendar information and an electronic address of one or more participants. A scheduling function is executable by the processor to schedule a conference call on the system server between the one or more participants that are system users at the time of the conference call according to the calendar information in the conference call request email. Also provided is a method for conference calling whereby a conference call request is received via email.

33 Claims, 13 Drawing Sheets

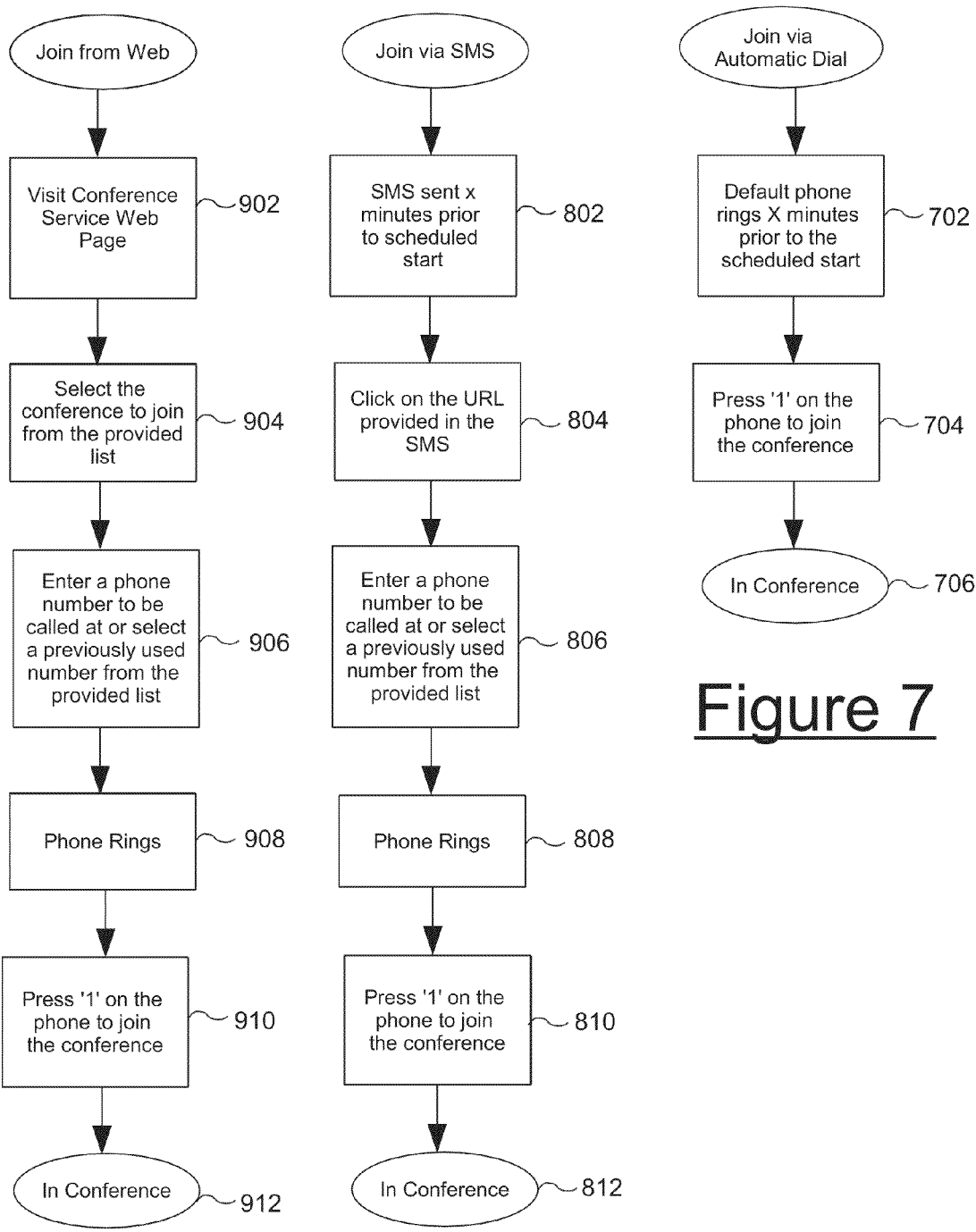

SYSTEM AND METHOD FOR CONFERENCE CALLING

FIELD OF THE INVENTION

This invention relates in general to conference calling.

BACKGROUND OF THE INVENTION

Traditional conference call services may rely on one of two common approaches to schedule a conference call or session to be used for a conference call between two or more geographically separated people. The first approach is to schedule a conference call by using an online interface or by calling a call center. This approach may be most commonly used when the meeting requires unique features or has a number of participants above a given threshold, typically around 150 simultaneous connections. The second approach provides a set of dial-in telephone numbers and a unique passcode for a subscription-type conference call. In order to use the subscription-type service for a conference call, each conference call participant connects to the conference call using the dial-in telephone number and passcode information provided by the organizer or host of the conference call.

The present inventors have recognized several drawbacks to the traditional approaches to conference calling. The first approach requires that the organizer of the call take some action with the service provider to schedule the required resources for the call. This typically adds several steps to process required to schedule the call. One such step is that the organizer is required to distribute to the participants the information required to attend the conference call.

Under the second traditional approach, the arranger is still required to distribute all information to conference participants for connecting to the conference call. The present inventors recognized that this approach represents a significant potential security risk since the dial-in telephone numbers and passcode are typically reused for all of the conference calls conducted by the organizer. While it is possible to generate and use a new subscription, including a new conference access number and/or access code, for each conference call or conference call series, users are burdened by the added steps required to schedule multiple conference calls, each under its own conference access number and/or access code. The burdensome nature of such scheduling results that in practice, the same conference access number and access code are reused for many different meetings by the organizer. This is problematic if the information discussed on any particular conference call is confidential such that a person provided access information to a first call should not receive access to a second call. Yet, if the same subscription information is used for both calls, participants on the first call can access the second call, even if not invited to the second call, because the same conference access number and/or access code is used for both calls.

Regardless of the approach used, when it is time to join the conference call, participants need to look up the telephone access number and access code to be used to join the conference call. For participants connecting from outside of North America, these participants also typically need to look up the telephone number to dial based on their location at the time they are connecting to the conference call. If the telephone access number and access code are in an email, the user will need to find that email to join the call. If the participant is trying to access the call while away from the office or a desktop computer, the participant may be forced to open an email application on the user's mobile device, copy down or memorize the access phone number and passcode and then switch to the mobile device's call function to call the access phone number and then enter the passcode. This burdensome process requires effort on the part of the participants and represents a potentially significant safety risk for those people engaged in operating motor vehicles when they attempt to join a conference call.

The present inventors recognized that it would be desirable to provide a conference scheduling system that reduces the number of steps required for the organizer to schedule a conference call. The present inventors recognized that it would be desirable to eliminate the need for a conference call organizer to distribute call-in information, such as a call in phone number and access code, to the conference participants.

Further the present inventors recognize the need for a conference system that reduces the burden of scheduling and increases per-call security so that only those invited to a call will have access to that call. The present inventors recognized the need for a conference system that does not require the user to look up the conference call access phone number or access code at the time of the conference call. The present inventors recognized the need for a conference system that dials out to participants that are authorized to participate in a given conference call and thereby joins that participant to the conference. Moreover, the present inventors recognized that it would be desirable to schedule a conference call using pre-existing software tools such as an email program having calendar functionality.

SUMMARY OF THE INVENTION

A system and method of conference scheduling is disclosed. A method of conference calling comprises the steps of: receiving a conference call request email on system server, the conference call request email comprising calendar information and an electronic address of one or more participants; determining whether each of the one or more participants is a system user by querying a user database, the user database having telephone contact information and an electronic address for each system user; and, scheduling a conference call on the system server between the one or more participants according to the calendar information in the conference call request email.

In some embodiments, the step of scheduling a conference call is further defined in that only participants that are system users are scheduled for the conference call.

In some embodiments, the method comprises the step of registering a participant that is not a system user as a system user by: sending the participant an electronic message to the electronic address of the participant, the electronic message having connection information for connecting to a user registration page; confirming the identity of the participant through the use of said connection information; receiving telephone contact information from the participant; and storing the telephone contact information associated with the electronic address of the participant in the user database.

In some embodiments, the step of sending is further defined in that the connection information comprises a unique identifier corresponding to the participant. The step of confirming is further defined in that the identity of the participant is confirmed through the unique identifier.

In some embodiments, the step of sending is further defined in that the connection information is a uniform resource locator (URL) having a time-limited validity and comprising a unique identifier corresponding to the participant; and wherein the step of confirming is further defined in that the identity of the participant is confirmed through the unique identifier.

In some embodiments, the method comprises the steps of starting the conference call by the system server instructing a conference bridge connected to a telephone network to dial the telephone contact information of one or more of the participants that are system users; and, joining, through the conference bridge, calls received from the one or more participants to the conference call.

In some embodiments, the method comprises the steps of receiving a request from at least one participant that is a system user to access a conference call start webpage; receiving from the participant a participant phone number for connecting to the conference call; dialing the participant phone number through a conference bridge connected to a telephone network according to instructions from the system server; and joining, through the conference bridge, the participant into the conference call.

In some embodiments, the method comprises the step of, before receiving a request from the at least one participant, sending one or more participants a conference start electronic message prior to a conference call start time, the conference start electronic message having connection information for connecting to the conference call start page; and wherein the step of receiving a request from at least one participant comprises the step of receiving a request from at least one participant to access the conference call start webpage corresponding to the connection information.

In some embodiments, the method comprises the steps of, after receiving a request from the at least one participant to access a conference call start webpage, determining whether the participant is authorized to access the conference call corresponding to the conference call start page; and serving to the participant the conference call start page only if the participant is authorized to access the conference call corresponding to the conference call start page.

In some embodiments, the calendar information is in an iCalendar format.

In some embodiments, the method comprises the step of after receiving a conference call request email on a conference call server, determining whether a sender of the conference call request email is authorized to schedule conference calls by querying the user database. The conference call is only scheduled if the sender is authorized to schedule conference calls.

A system of conference calling is disclosed. The system of conference calling comprises a conference computer system comprising, a processor, and a memory signal connected to the processor, the memory having at least one user record associated with a system user, the user record comprising, telephone number and an electronic address for each system user. The system comprises a conference call request receiving function executable by the processor to receive a conference call request email, the conference call request email comprising calendar information and an electronic address of one or more participants. The system comprises a participant authentication function executable by the processor to determine whether each of the one or more participants is a system user by querying a user database, the user database having telephone number and an electronic address for each system user. The system comprises a scheduling function executable by the processor to schedule a conference call on the conference computer system between the one or more participants according to the calendar information in the conference call request email.

In some embodiments, the scheduling function only schedules the conference call between participants that are system users.

In some embodiments, the system has a user registration function executable by the processor to register participants that are not system users as system users. The user registration function comprises, a send registration request function, an identity confirmation function, an information receiving function, and an information storage function. The send registration request function is executable by the processor to send the participant an electronic message to the electronic address of the participant, the electronic message having connection information for connecting to a user registration page. The identity confirmation function is executable by the processor to confirm the identity of the participant through the use of said connection information. The information receiving function is executable by the processor to receive a telephone number from the participant. The information storage function is executable by the processor to store the telephone number associated with the electronic address of the participant in the user database.

In some embodiments, the connection information sent by the send registration request function comprises a unique identifier corresponding to the participant. The identity confirmation function is executable to confirm the identity of the participant through the use of unique identifier.

In some embodiments, the computer system comprises a conference call bridge in signal communication with the processor, the conference call bridge configured to connect with a telephone network and to join calls into one or more conference calls.

In some embodiments, the system comprises a conference call bridge in signal communication with the computer system, the conference call bridge configured to connect with a telephone network. The system also comprises a start conference call function executable by the processor to instruct the conference bridge to dial the telephone number of one or more of the participants that are a system users at a time of the dialing, wherein the calendar information comprises the conference call start time; and a join call to conference function executable by the conference bridge to join one or more calls of the one or more participants to the conference call, where calls of the one or more participants are received by the conference bridge from the telephone network.

In some embodiments, the system comprises an organizer authentication function executable by the processor to determining whether a sender of the conference call request email is authorized to schedule conference calls by querying the user database; and, wherein the a scheduling function is further defined in that scheduling only occurs if the sender is authorized to schedule conference calls.

A further embodiment of the conference calling system is disclosed. The conference system comprises a conference call server having a processor, and a memory signal connected to the processor, the memory has a user database, the user database has at least one user record associated with each system user, the user record comprising, telephone number and an electronic address for each system user. The system has a conference bridge signal connected to the conference call server. The conference bridge configured to connect with a telephone network. The system has a conference call request receiving function stored on the memory and configured to receive a conference call request email. The conference call request email has calendar information and an electronic address of one or more participants. The conference system has a participant authentication function stored on the memory and configured to determine whether each of the one or more participants is a system user by querying the user database. The user database has a telephone number and an electronic address for each system user.

The conference system also has a scheduling function stored on the memory and configured to schedule a conference call on the conference call server between the one or more participants according to the calendar information in the conference call request email. The conference system further has a start conference call function stored on the memory and configured to instruct the conference bridge to dial, at or before a conference call start time, the telephone number of one or more of the participants that are system users at a time of the dialing, wherein the calendar information comprises the conference call start time. The conference system further has a join call to conference function stored on the memory and configured to instruct the conference bridge to join calls from the one or more participants to the conference call.

In some embodiments, the conference system further has a restriction function that limits the number of connections that in individual participant may have simultaneously to one connection regardless of the connection mechanism.

Numerous other advantages and features of the present invention will be become readily apparent from the following detailed description of the invention and the embodiments thereof, from the claims, and from the accompanying drawings.

BRIEF DESCRIPTION OF THE DRAWINGS

FIG. 7 is a flow diagram showing a first call joining process of the conference system.

FIG. 8 is a flow diagram showing a second call joining process of the conference system.

FIG. 9 is a flow diagram showing a third call joining process of the conference system.

DETAILED DESCRIPTION

Figure 1:
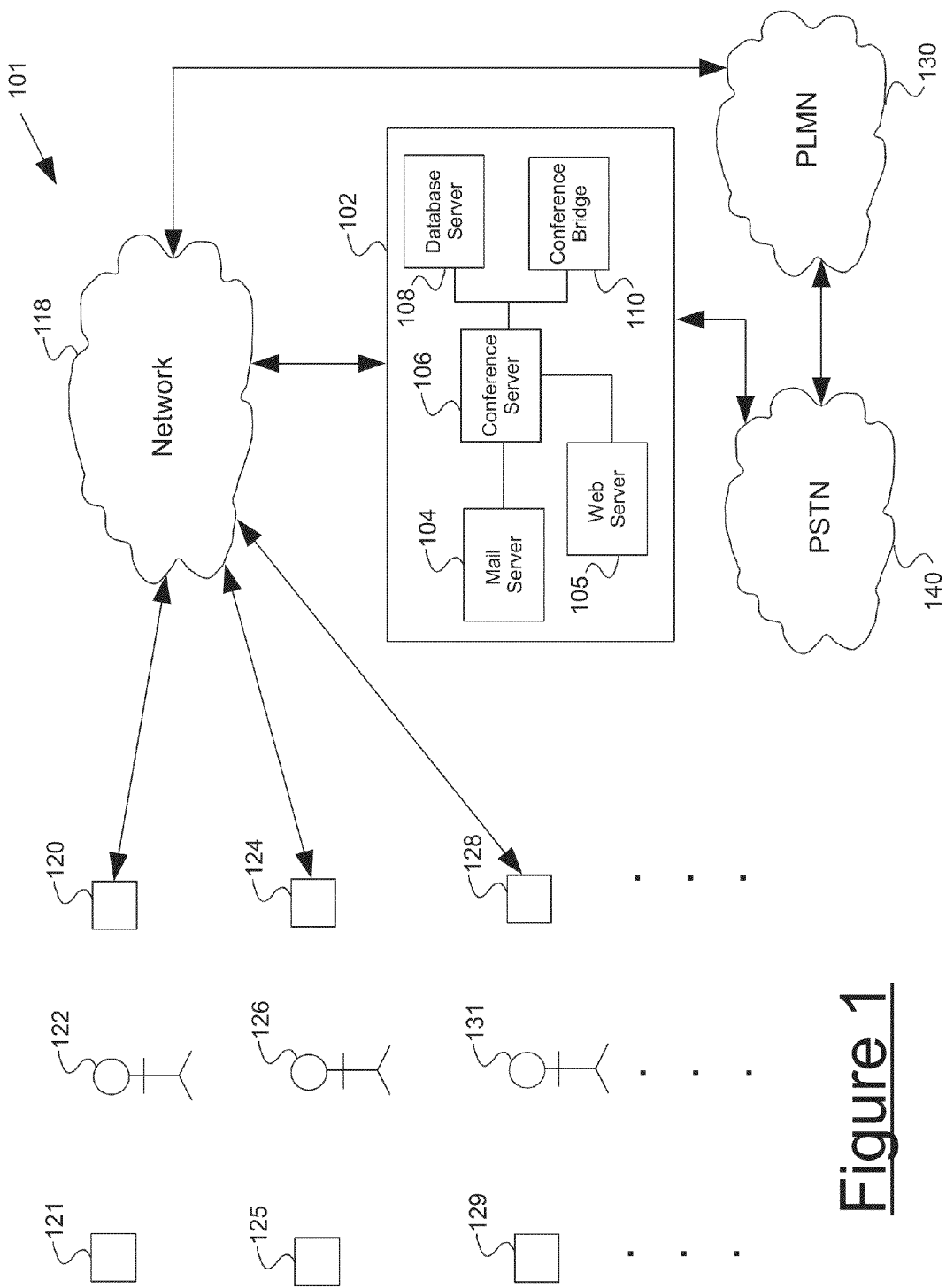
FIG. 1 is a block diagram of an example conference system in a communication network.

Methods and systems for conference calling, scheduling, and routing are disclosed. The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows a block diagram of an exemplary communications system 101 in which an embodiment of the conference system of the invention may be implemented. The conference system 102 comprises a mail server 104, a web server 105, a conference server 106, a database server 108, and a conference bridge 110. The communications system 101 of FIG. 1 comprises a plurality of user devices 120, 124, 128.

The user devices 120, 124, 128 and the conference system 102 are connected to network 118, such as the Internet. However, it will be understood that the user devices 120, 124, 128, and the conference system 102 may connect through one of a number of different types of networks, such as local area networks (LANs), wide area networks (WANs), or other networks. The user devices may connect to the network(s) by wired or wireless connections. The LANs or WANs may include wireless access stations and the user devices may connected to the LANs or WANs through those access points. Further, it is possible that some user devices and the conference system 102 are connected to a local network while other user devices are connected to a WAN, which is connected to the local network having the conference system 102. Therefore, it will be appreciated that any number of routes may exist across one or more networks between the conference system and any of the user devices.

User devices 120, 124, 128 may include personal computers (PCs), mobile Internet devices, personal digital assistants (PDAs), tablet PCs, phones, smart phones, or other Internet or network connectable devices. Each user device generally includes one or more processors signal connected to memory storage, input/output devices, and a wired and/or wireless network interface device. The signal connection of the processor(s) to the memory storage, the input/output devices, and the wired or wireless network interface device may occur over a system computer bus. When the device includes a wireless network interface device, it will be understood that the device includes one or more radio transceivers and associated hardware and software to enable wireless communication with the network 118, such as under IEEE 802.11 wireless communication standards. In some embodiments, the user devices 120, 124, 128 include any electronic device capable of sending or receiving electronic messages, such as email. Further the devices 120, 124, 128 may be loaded with or capable of executing a computer program, such as a World Wide Web browser, capable of communicating with the web server, such as Microsoft Internet Explorer, Mozilla Firefox, or Google Chrome, Apple Safari.

When the user device is a mobile phone, the device may include one or more radio transceivers and associated hardware and software to enable wireless communication with one or more Public Land Mobile Networks (PLMN) 130. In some embodiments, the PLMN 130 and the devices 120, 124, 128 are configured to operate according to one or more wireless standards, such as EDGE, CDMA, 3G, 4G, 4G LTE, HSPA, EvDO, GSM, PCS or others. The devices may be capable of communicating via Short Message Service (SMS) protocol, or the Multimedia Messaging Service (MMS) protocol. The device may move with a user within the PLMN and between multiple PLMNs. The device may communicate through the PLMN to the network 118, such as to send and receive information from the Internet when the network 118 is the Internet.

In some embodiments, one or more users have a second phone device 121, 125, 129, particularly where devices 120, 124, 128 do not have a telephone functionality. The second phone device may be a mobile phone such as just described regarding devices 120, 124, 128. In the case where one or more of the second phone devices are mobile phones, such mobile phones will connect with the PLMN. In the case where one or more of the second phone devices are landline connected phones, such phones are connected to a Public Switched Telephone Network (PSTN). The PSTN is connected to one or more PLMNs to enable calling between mobile and landline phones. The second phone devices 121, 125, 129 are capable receiving calls from the conference system and calling into conference calls of the conference system. The same is true with devices 120, 124, 128 that have telephone functionality.

The mail server 104 is configured to send, store, and receive electronic messages, such as e-mail. In some embodiments, the mail server is a Microsoft® Exchange Server. The mail server will store messages addressed to a user message address registered with the mail server. Messages may be retrieved by such user using a messaging application, such as an email client application, and/or user messages may be retrieved by the conference server using an email protocol, such as POP, SMTP, IMAP, or the like.

Figure 1A:
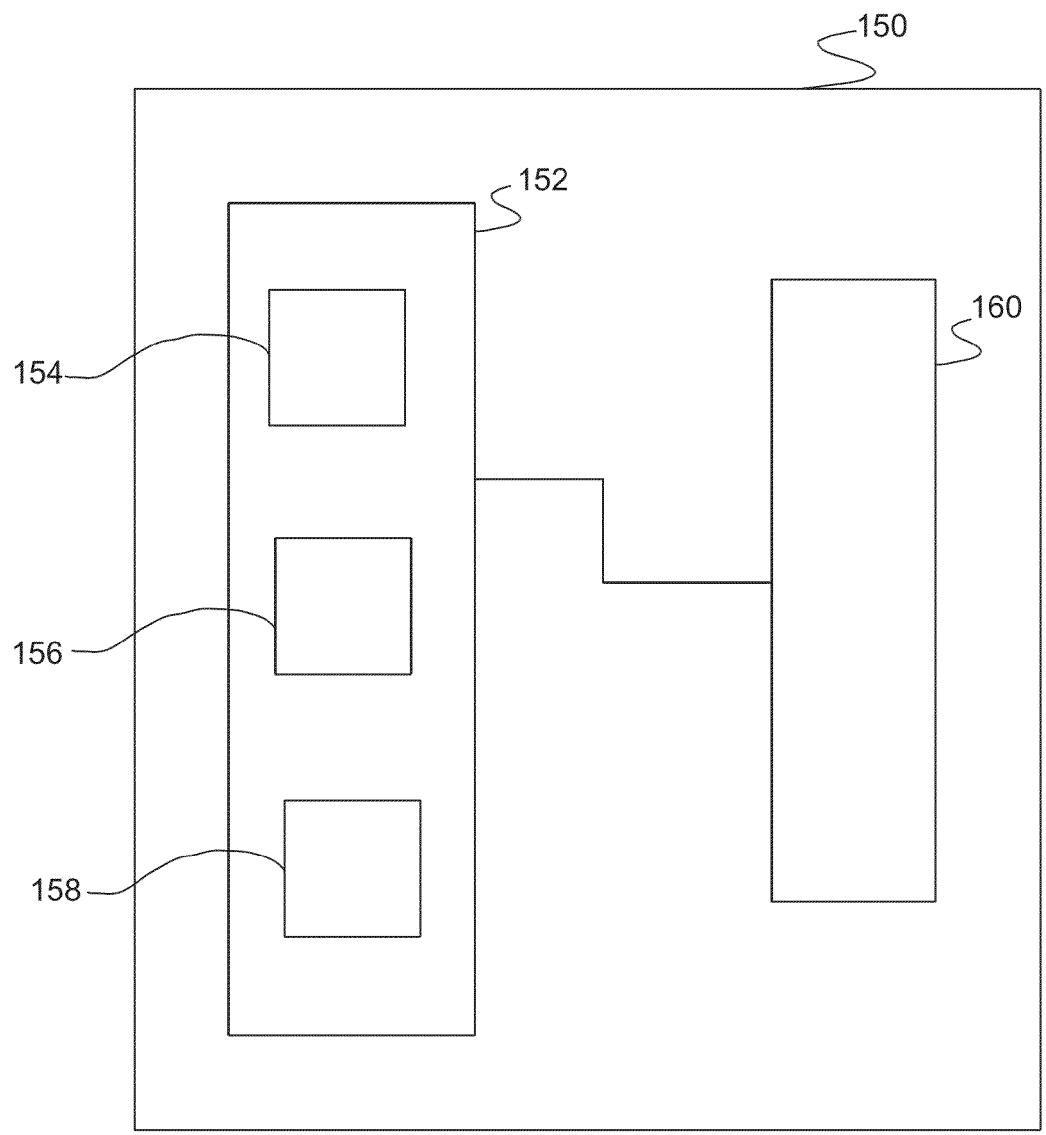
FIG. 1A is a block diagram of an example server computer useable by the conference system.

In some embodiments, the mail server 104, the web server 105, the conference server 106, the database server 108, are on separate server computers. In some embodiments, one or more of the mail server 104, the web server 105, the conference server 106, the database server 108 are applications or processes running or runnable on the same computer, such as a server computer. An exemplary server computer 151) is shown in FIG. 1A. The server computer comprises a computer storage medium 152 and a processing system 160. The computer storage medium 152 may comprises one or more databases 154, 156, 158. In the embodiment shown, the computer storage medium 134 comprises at least a user database 154, a scheduling database 156, and a connection database 158. In some embodiments, the databases 154, 156, 158 maybe located externally or remotely from and signal connected to the processing system 160. In some embodiment, the databases 154, 156, 158 are located on separate computer storage mediums. In some embodiments, each database spans across multiple computer storage mediums. In some embodiments the databases 154, 156, 158 are separate tables within a database. In some embodiments, the database can include other relationship recording structures in a computer datastore, such as a flat file, or other computer data structures known in the art.

In some embodiments, the processing system 160 comprises one or more processors signal connected to RAM memory storage, a wired and/or wireless network interface device, and optionally, input/output devices. The signal connection of the processor(s) to the memory storage, the input/output devices, and the wired or wireless network interface device may occur over a computer system bus. Other hardware arrangements for servers computers known is the art may also be used. In some embodiments, the computer storage medium comprises one or more hard drives and/or one or more solid state drives.

The system or method of the invention may be implemented in computer software that is stored as executable instructions on one or more tangible computer storage media, such as RAM memory or one or more mass storage devices, or a combination thereof on the computer, such as the computer server 150, or connected to the computer, or on or across multiple computer servers, and said instructions executable by one or more processors of the computer or across multiple computer servers to implement the system or method of the invention described herein.

The conference system 102 is connected to the PSTN through the conference bridge 110. The conference bridge may be configured to implement, or may be connected to a Private Branch Exchange (PBX) or IP PBX, which will be referenced as PBX. The PBX receives connections from the PSTN. The PBX may receive an analog connection, ISDN BRI, TI, E1, and or J1 connection or trunk from PSTN. Such connection provides the conference system 102 with two or more phone lines from which a conference call can be achieved. The number of simultaneous conference attendees will depend on the number connections that are provided to the conference bridge.

In some embodiments, the conference bridge is connected via a network, such as network 118, to a third party Voice-over-IP (VoIP) provider that interfaces with the PSTN and then routes calls to and from the conference bridge via the network 118, under a packet-switched protocol. In such cases, the conference bridge may operate as a Session Initiation Protocol (SIP) server to set up, manage, and terminate sessions for voice calls. Other VoIP protocols may also be used. In some embodiments, user devices can connect a Voice-over-IP call to or from a conference directly via the network to the conference bridge, if the user device has Voice-over-IP capabilities. Therefore, in some embodiments, the PSTN may be avoided for VoIP conference participants.

In some embodiments, the conference bridge is connected to PBX of an enterprise where both local users connected to the PBX as well as users that are connected via the PSTN or the PLMN can connect to a conference call arranged by the conference system. In this arrangement, the PBX operates to both provide the conference bridge with lines for conference calling as well as to provide local users with telephony extensions connectable to the PSTN through the PBX.

Scheduling Entry.

Figure 2:
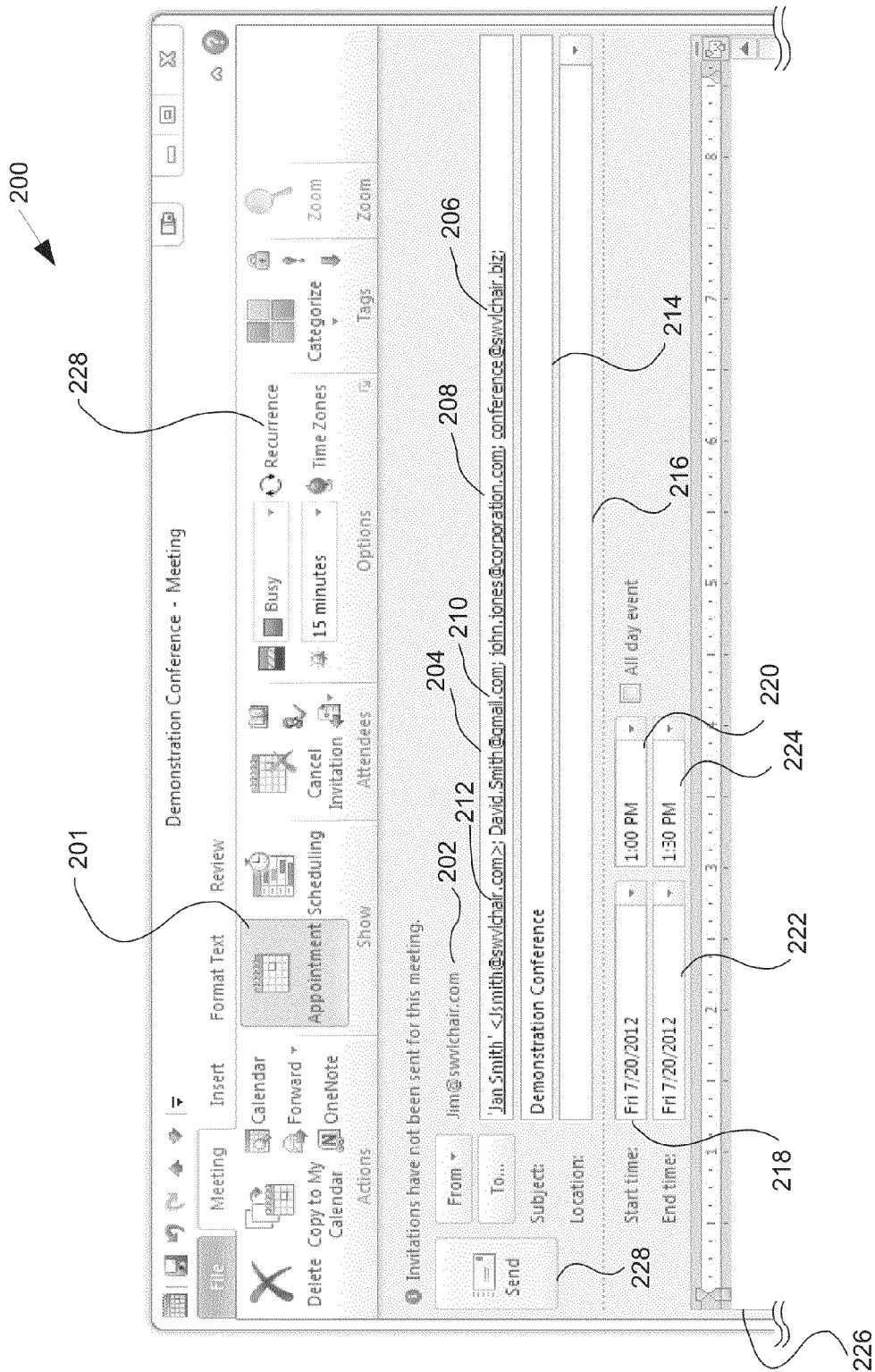
FIG. 2 is an exemplary calendar entry/meeting appointment scheduling screen from an email program.

The conference system provides a system and method for scheduling and conducting a conference call. Conference calls can be scheduled by pre-authorized organizer users, such as organizer user 122. The organizer does this by creating a calendar entry that invites participants, such as participants 126, 131, as well as a conference resource email address, such as conference resource email address conference@swvlchair.biz 206, to a conference call. FIG. 2 shows an exemplary calendar entry/meeting appointment screen from a calendar program, such as Microsoft Outlook, having an email function. One advantage of the present invention is that no conference specific plug-in software or client software is required to schedule a conference call. Any calendar application having the capability of inviting meeting participants via the participant's electronic address, such as an e-mail address, may be used to schedule conference calls in the conference system. Such calendar applications may include Microsoft Outlook, Lotus Notes, Google Calendar, iPhone Calendar, Yahoo!Calendar, or Mozilla Thunderbird.

The calendar entry/meeting appointment screen shown in FIG. 2 provides a To field 204 where the organizer provides the email addresses of the conference call participants, which are to be invited to the conference call. Also included in the To field 204 is the conference resource email address (conference@swvlchair.biz) 206 of the conference system. The organizer may complete the Subject field 214 with the subject of the conference call. The organizer may complete the Location field 216 with the location of the conference call. This may be used in case there is a hybrid conference where some participants will join the conference call and other will meet at a location, such as a conference room, which will also join the conference call. The organizer user will define the start time and, optionally, the duration of the conference call by providing a start date in the start date field 218, a start date and time in the start time field 220, an end date in the end date field 222, and an end time in the end time field 224. The organizer user may also include additional content related to the conference in the body field 226.

In calendar entry/meeting appointment screen shown in FIG. 2, the organizer user is identified by the email address Jim@swvlchair.com, the conference participants are identified by participant email addresses jsmith@swvlchair.com, David.Smith@gmail.com, and john.jones@corporation.com 212, 210, 208. The conference system maintains and hosts one or more conference resources email addresses, such as conference resource email address conference@swvlchair.biz 206 on the mail server 104.

In some embodiments, the calendar application formats the calendar information provided by the organizer user's calendar entry/meeting appointment entry into the a file having an iCalendar data/object format, which has a file extension of ".ics". Internet Calendaring and Scheduling Core Object Specification (iCalendar) is a standard for calendar data exchange, which is defined by Request for Comments (RFC) 2445 of the Internet Engineering Task Force (IETF). The iCalendar standard allows the exchange of meeting times, to-do entries, and other data among compliant applications. iCalendar data is generally exchanged using traditional email programs, yet the standard is intended to be independent of any transport protocol.

Shown below is exemplary calendar information provided in iCalendar format corresponding to the data entered in FIG. 2.

BEGIN:VCALENDAR
    PRODID:-//Microsoft Corporation//Outlook 12.0 MIMEDIR//EN
    VERSION:2.0
    METHOD:REQUEST
    X-MS-OLK-FORCEINSPETOROPTOROPEN:TRUE
    BEGIN:VEVENT
    ATTENDEE;CN="'Jan Smith'";RSVP=TRUE:mailto:Jsmith@swvlchair.com
    ATTENDEE;CN=David.Smith@gmail.com;RSVP=TRUE:mailto:David.Smith@gmail.com
    ATTENDEE;CN=john.jones@corporation.com;RSVP=TRUE:mailto:john.jones@corporation.com
    ATTENDEE;CN=conference@swvlchair.com;RSVP=TRUE:mailto:conference@swvlchair.com
    CLASS:PUBLIC
    CREATED:20120715T152726Z
    DESCRIPTION:Additional Details Related to Conference\n
    DTEND:20120720T183000Z
    DTSTAMP:20120715T152726Z
    DTSTART:20120720T180000Z
    LAST-MODIFIED:20120715T152726Z
    LOCATION:Conference Room
    ORGANIZER;CN="Jim@swvlchair.com":mailto:Jim@swvlchair.com
    PRIORITY:5
    SEQUENCE:0
    SUMMARY;LANGUAGE=en-us:Demonstration Conference
    TRANSP:OPAQUE
    UID: 040000008200E00074C5B7101A82E00800000000B-0506B3F1976CD01000000000 0000000100AC2D-CABAEDBE6F489CDBFDCC9B530D26
    END:VEVENT
    END:VCALENDAR According to the iCalendar standard, the VEVENT calendar component is a grouping of component properties that represents a scheduled amount of time on a calendar. In this example, the scheduled time corresponds to a conference call. Therefore the BEGIN:VEVENT signals the beginning of the grouping of components corresponding to the scheduled event and the END:VEVENT signals the end of said grouping.

In the iCalendar formatted data shown above, the email addresses specified as values for the ATTENDEE parameters correspond to the participant email addresses 208, 210, 212 and the conference resource email address 206 specified in the To field 204 in FIG. 2. The email address specified in the ORGANIZER parameter corresponds to the organizer's email address 202. Subject "Demonstration Conference" provided in the subject field 214 corresponds to the SUMMARY parameter. The DTSTART parameter provides the date in the format YYYYMMDD, and the time following the "T" formatted HHMM based on Coordinated Universal Time (UTC) and a 24 hour format. The start time 1:00 PM Central Daylight Time (CDT) shown in FIG. 2 is represented in UTC time of 1800 in the DTSTART parameter and the date is represented as 20120720. CDT is 5 hours behind UTC. The DTEND parameter is formatted in the same matter as the DTSTART parameter. The value of the DTEND represents the end date and time shown in FIG. 2. The LOCATION parameter will have a value that is provided in the location field 216 in FIG. 2, however the value "Conference Room" is not shown in FIG. 2. The DESCRIPTION parameter will have a value that is provided in the body field 226, however the value "Additional Details Related to Conference" is not shown in FIG. 2.

One skilled in the art will recognize that not all of the parameters shown in the iCalendar formatted information above are necessary or will be included in each calendar information set provided in iCalendar format for a conference call request. Further it will be recognized that depending on the user's calendar software additional parameters not shown above may be included in the iCalendar data. In one embodiment, the minimum parameters for scheduling a conference call needed in the iCalendar formatted file are the ATTENDEE, DTSTART, and ORGANIZER parameters, as well as the standard iCalendar indicators BEGIN:VCALENDAR, END:VCALENDAR, BEGIN:VEVENT, END:VEVENT.

The iCalendar formatted file is then attached to or included in an email message by the calendar/email program and sent to all of the email addresses in the To field 204 including the conference resource email address 206. The conference system may utilize other calendar formats that have the capability of identifying at least the meeting organizer, the meeting participant's by electronic address, and the start date and time of the meeting. In some embodiments, the calendar application provides the information provided by the organizer user calendar entry/meeting appointment in-line in the body of the email sent to all of the email addresses in the To field 204. Other calendar data file format standards such as vCalendar format, may also be used.

In addition to scheduling, an organizer can modify aspects of the conference call or cancel the meeting by using the calendar application. The user can open the appointment that was generated on the user's calendar by the initial scheduling of the conference call. Changes to the appointment that involve the start date or time, end date or time, participants, subject, location, or other parameters are communicated to the conference system via an email to the participants including the conference resource email address 206 when changes to the appointment are saved by the user. Therefore, organizers can easily make changes to the conference call using calendar appointment modification/cancellation functions in a Calendar application with which they are already familiar.

Processing Requests.

The conferencing system has a conference request watch function running on or by the conference server 106 that regularly checks for conference call requests emails directed one or more of the conference resource email addresses, such as conference@swvlchair.biz 206. The conference request watch function can be configured to check for conference request emails at a regular interval, such as every minute, every 5 minutes, or once a day, or at other intervals. In some embodiments, the conference request watch function checks for incoming conference request email continuously.

The conference request watch function is configured to connect with the mail server 104 that is acting as an email server for one or more conference resource email addresses, and to check for and received email messages directed to conference resources email addresses, such as conference resources email addresses 206. In some embodiments, the conference system does not include an email server, but instead the email server is hosted by a third party and the conference request watch function is configured to check and retrieve email messages from the third party server. The conference request watch function may communicate with the mail server using known email or electronic message protocols, such as POP3, SMTP, and/or IMAP.

Figure 3:
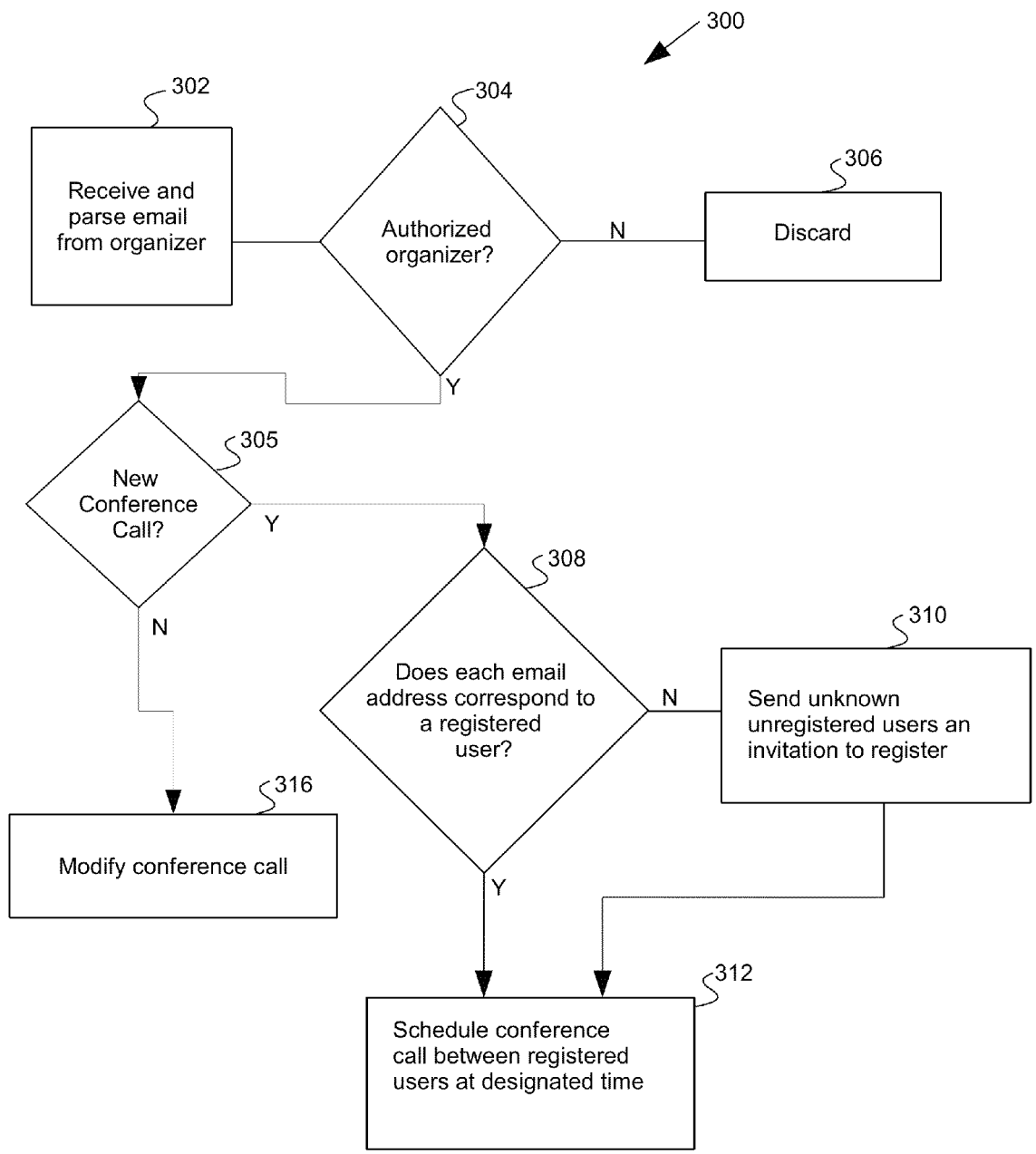
FIG. 3 is a flow diagram showing a conference scheduling process of the conference system.

The conferencing system has a conference request processing function 300 running on or by the conference server 106 for processing conference requests, which can include conference modification requests, retrieved by the conference request watch function. FIG. 3 shows an exemplary conference scheduling process performed by the conference request processing function. At step 302, the conference request processing function parses the email having calendar information, such as the start date and time shown in FIG. 2. In some embodiments, the system is configured to expect the calendar information to be provided in the iCalendar format. By parsing the email, the conference request processing function will retrieve the following information about the conference call: the organizer's email address 202, the participant's email addresses 208, 210, 212, the start date, the start time, and, optionally, the end date, and the end time. When the calendar information is provided in iCalendar format the system may be configured to recognize iCalendar format parameters corresponding to at least the organizer's email address 202, the participant's email addresses 208, 210, 212, the start date, the start time. The system may also parse the email for information indicating that prior scheduled conference call should be modified or cancelled.

At step 304 the processing function 300 will check the user database 154 for a user record 500 having an email address in the email address section 502 of the user record that matches the organizer email address 202. If a match is found in the user database, the processing function checks an organizer section 515 of the user records to determine whether the user is authorized to organize conference calls. If the user is authorized to organize conference calls, then the processing function proceeds to step 305. If a match is not found in the user database or if the user is not authorized to organize conference calls, the system discards the request at step 306. The system may optionally send appropriate error emails to the organizer explaining that the organizer is not a registered user or that the organizer is not authorized to organize conference calls in the conference system.

At step 305, the system determines whether the calendar information provided in the request email indicates a new conference call should be scheduled or indicates that a previously schedule conference call should be modified or cancelled. If the calendar information indicates a new conference call is requested, the system proceeds to step 308. If the calendar information indicates that a previously scheduled conference call should be modified the system proceeds to step 316.

At step 308, the processing function 300 checks each participant email address 208, 210, 212 against the user database by comparing the email addresses 208, 210, 212 to the email address in the email address section 502 of each user record until a match is found. For each participant that is not a user in the user database 154, at step 310, the conference server, either directly or through the mail server 104, sends the participant an electronic message inviting the participant to join as a registered user of the conference system. If the invited participant accepts the invitation, the system will call the new user registration function 400.

At step 312, the processing function 300 schedules the conference call between the participants and the organizer at the start date and time provided in the start date field 218 and the start time field 220. In some embodiments, scheduling the conference call involves updating three tables in the scheduling database: the calendar table, the conference attendee table, and the conference schedule table, and calling the event scheduling function described below.

Figure 6A:
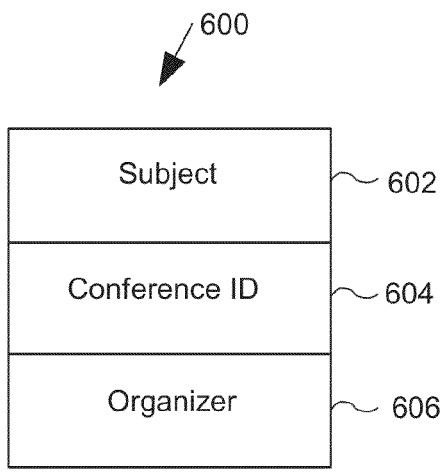
FIG. 6A is a diagram of an exemplary calendar record of the conference system.

An example calendar entry or record 600 of the calendar table is shown in FIG. 6A. The calendar entry 600 has a subject section 602, a unique conference ID section 604, and a meeting organizer section 606. The subject section is for containing the subject of the conference, such as the subject contained in the subject field 214. The unique conference ID section is for containing a unique conference ID reference for the conference being scheduled. The meeting organizer section is for containing a reference to the organizer's user record, such as the meeting organizer's email address that would be continued in the email address section 502 of the user record.

Figure 6B:
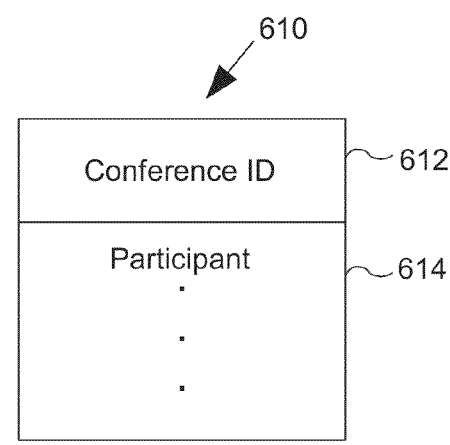
FIG. 6B is a diagram of an exemplary attendee record of the conference system.

An example conference attendee record 610 of the conference attendee table is shown in FIG. 6B. The conference attendee record 610 comprises the conference ID section 612, and a participant section 614. The conference ID section is for containing the unique conference ID from the calendar entry 600 of the calendar table. The conference call participant section is for containing a list identifying conference call participants, such as a list of email address of conference call participants.

Figure 6C:
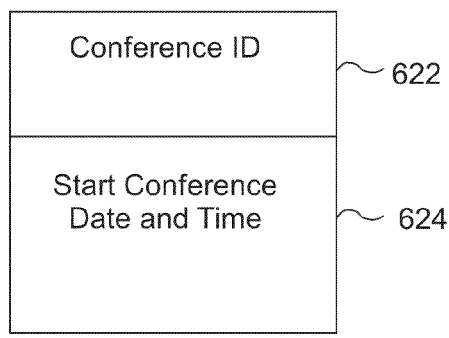
FIG. 6C is a diagram of an exemplary conference schedule record of the conference system.
Figure 6D:
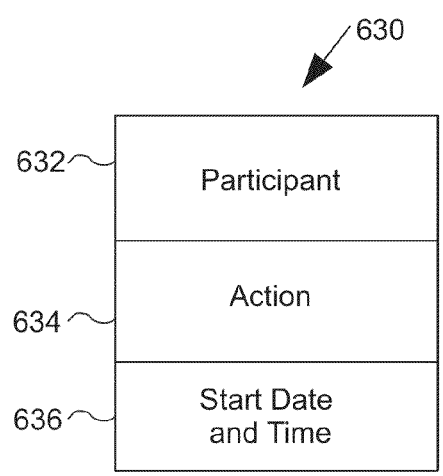
FIG. 6D is a diagram of an exemplary event record of the of the conference system.
Figure 10:
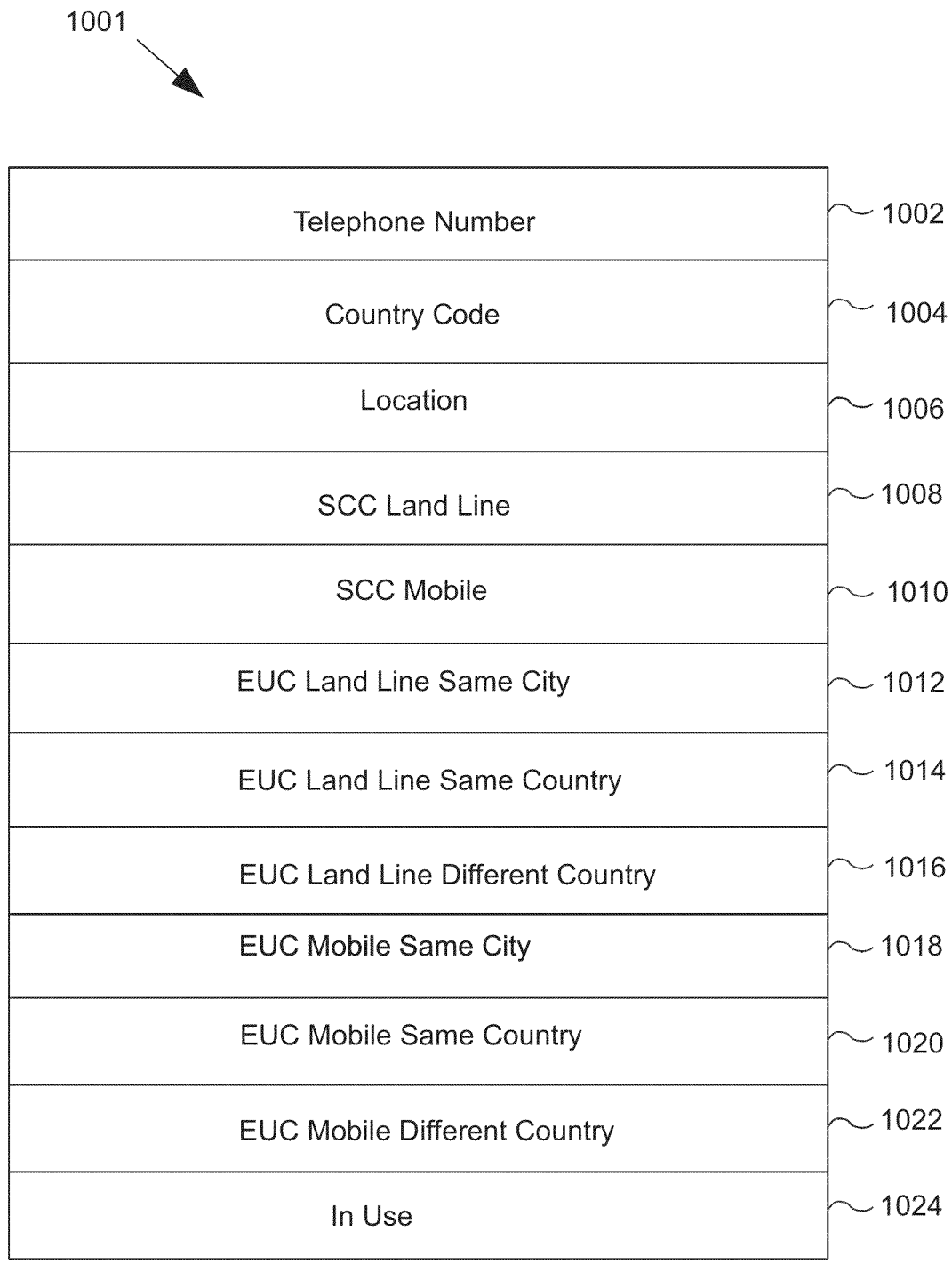
FIG. 10 is a diagram of a connection cost record of an embodiment of the conference system.

An example conference schedule record 620 of the conference schedule table is shown in FIG. 6C. The conference schedule record 620 comprises a conference ID section 622 and a conference start date and time section 624. The conference ID section is for containing the unique conference ID of section 602 and 612 so that the calendar record, the attendee record, and the schedule records are all associated by a common conference ID. The conference start date and time section is for containing the start date and time of the conference call, such as was provided in fields 218 and 220.

It will be recognized that the data structures illustrated in FIGS. 6A-6C provide one structure for holding the data and that many other data structures may be used, as would be recognized by one skilled in the art. For example, in some embodiments, records 600, 610, 620 may be combined in a single record in a single table.

At step 312 the processing function 300 creates a calendar record 60) in the calendar table by generating a unique id which is placed in the conference ID section 604, adding the subject from field 214 in the subject section 602, and adding the conference organizer's email address 202 from the calendar entry field corresponding to the organizer into the organizer section 606.

The processing function then creates a conference attendee record 610 in the conference attendee table by inputting the conference ID provided in section 602 into section 612 and by placing a conference call participant email address for each conference call participant, such as participants 208, 210, 212, into the participant section 614. In some embodiments, all of the participants 208, 210, 212 identified in the conference call request email are listed in the conference call participant section. At the time the conference is to begin only the participants that are registered users will be allowed to participate. In another embodiment, only participants that are registered users are listed in the participant section. As unregistered participants register, the system adds those participants to the participant section.

The processing function then creates a conference schedule record 620 in the conference schedule table by adding the conference ID provided in sections 602, 612 into section 622 and by adding the start date and time of the conference, such as the start date and time provided in fields 218 and 220, into the start date and time section 624.

In some embodiments, the conference schedule record includes information about a reoccurring conference or multiple conferences in the start date and time section 624 of the conference schedule record 620 or in multiple start date and time sections of the conference schedule record. In this manner, the organizing user can schedule, through the calendar entry screen 200, a re-occurring conference call, such as by selecting the reoccurring function 228 and defining the frequency and/or interval of the reoccurring conference. Therefore, the start date and time section 624 may include data regarding a multiple conferences, such as multiple the start dates and times, and/or the interval, and/or the frequency of a re-occurring conference.

In some embodiments, the conferencing system comprises a billing system. The billing system comprises a billing database. When processing a scheduling request email, the system scans the email for a field containing usage data, such a project code, client code, or a billing code. In some embodiments, the system may be configured to recognize usage data by a key word or code provided in a particular filed. For example, the system may be configured to look for the code "BC:" in the subject field 214 and to extract the string that follows the code "BC:" as the billing code for that particular conference call. The conferencing system will then provide information about the conference call related to the conference request and the particular billing code to the billing system, which will record the information in the billing database. The system may provide invoices to the organizer(s) or other system users having information from the billing database. In this way, the organizer will be able to track and expense individual conferencing calls to particular project or client of the user according to the user's own internal tracking codes.

At step 316, the system will carry out modifications to the conference call as indicated by the calendar information in the conference modification request. If the calendar information indicates the conference call should be cancelled, then the system will cancel the conference call and adjust or delete the corresponding event records accordingly. If the calendar information indicates that the conference start and/or end date and/or time should be changed or if the information indicates participants should be added or removed, the system will adjust the scheduled conference and the corresponding event records accordingly. If a participant is to be added to the conference, the system proceeds to step 208 to determine whether the system is a registered user. If the participant is a registered user the system adds the participant to the conference. If the participant is not a registered user the system proceeds to step 310 to invite the participant to register. If a participant is to be removed from the conference call, the system may optionally send the participant an email notifying them of their removal from the conference call.

It will be appreciated that each step defined as being carried out by a particular function should be carried out by a sub-function or a separate function, which when complete returns to the particular function, as would be recognized by one skilled in the art.

New User Registration.

Figure 4:
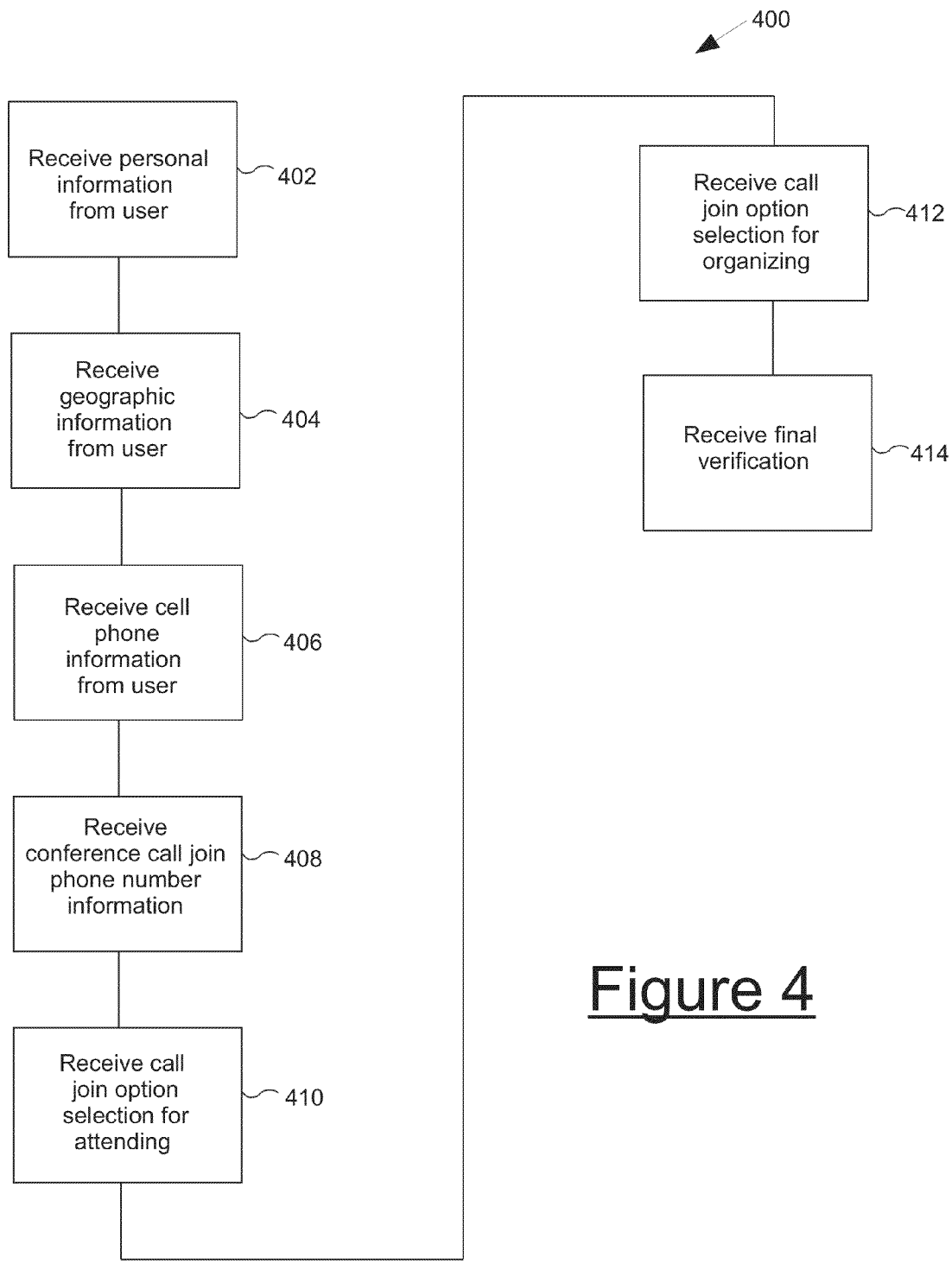
FIG. 4 is a flow diagram showing a new user registration process of the conference system.

The conference system has a new user registration function 400 shown in FIG. 4. At step 310, the conference server, either directly or through the mail server, sends the participant an invitation electronic message, such as an invitation email, inviting the participant to join as a registered user of the conference system. The invitation email informs that participant that the organizing user has invited that participant to join a conference call. The invitation asks the participant to register with the conference system and to verify the participant's email address. The invitation provides a link, such as a URL, that when activated in an application, such as an Internet web browser application, directs the participant to a registration webpage of the conference system.

The web server 105 of the conferencing system is capable of generating and displaying webpages, such as the registration webpage. The participant my use any Internet connected device, such as devices 120, 124, 128, to connect the web server, where the devise is capable of executing a computer program for communicating with the web server, such as Microsoft Internet Explorer, Mozilla Firefox, or Google Chrome, or Apple Safari.

Figure 5:
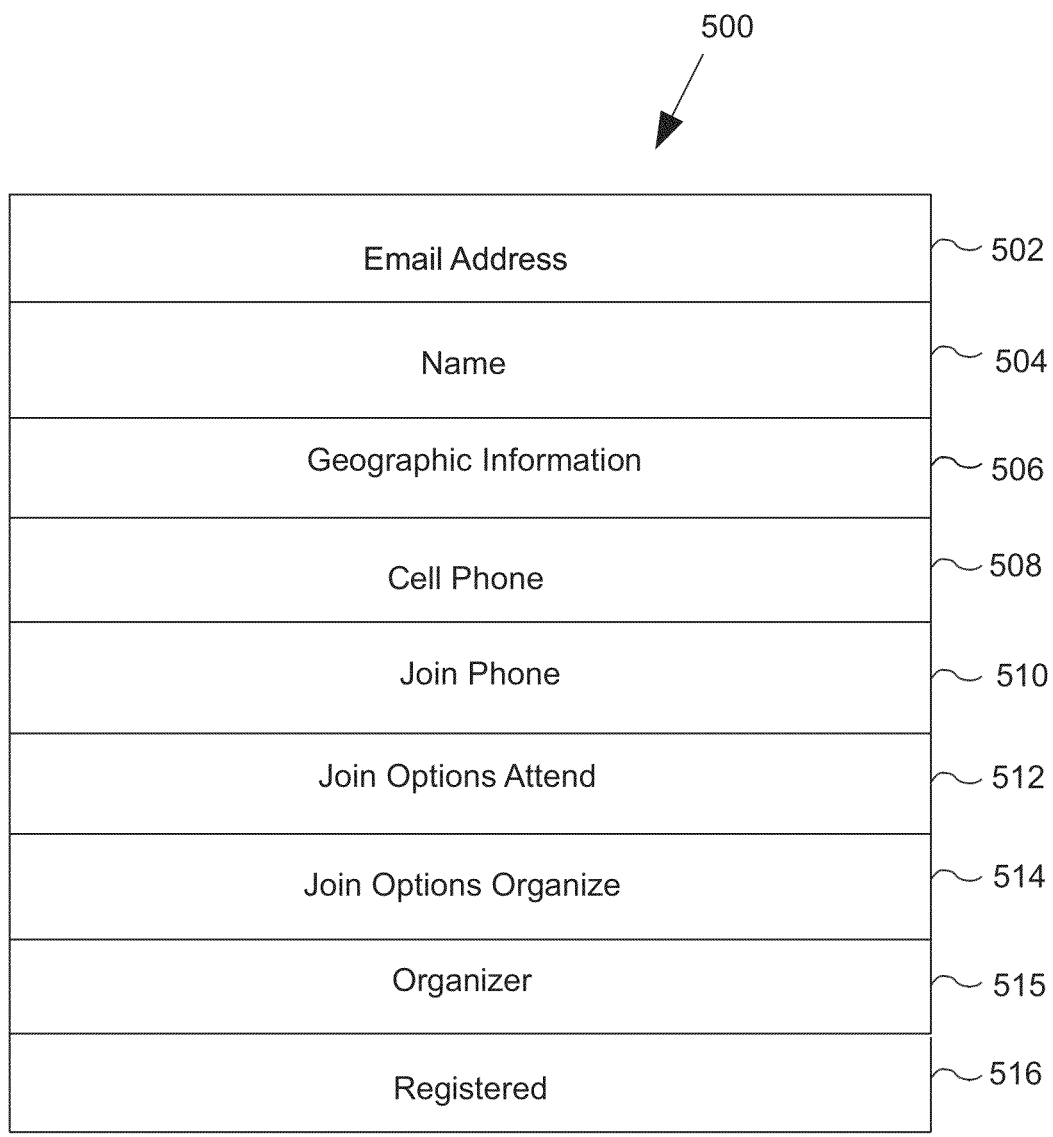
FIG. 5 is a diagram of an exemplary user record of the conference system.

The new user registration function requests from the participant information, via one or more new user registration webpages and that information is then placed by the conference system in a user record 500 in the user database 154. A user record is shown in FIG. 5. The user record has a email address section 502, a name section 504, a geographic information section 506, a cell phone section 508, a join phone section 510, a join option attend section 512, a join options organize section 514, a organizer flag section 515, and a registered flag section 516. At each of steps 402 through 414, the systems request information from the user by serving a webpage via the web server to the user.

At step 402, the system receives personal information from the participant via one or more registration webpage(s) when the participant selects "submit" or "next" or other submission indication that the system is configured to recognize. The personal information includes the participant's salutation, first name, last name, and suffix. This personal information is placed in the name section 504 of the user record. The URL provided in the invitation email includes information that the system uses to identify the participant, and therefore the system will place the participant's email address in the email address section 502. In some embodiments, the system receives an email label from the participant, such as "work email." The email label may be saved in the name section 504 or an email label section (not shown).

At step 404, the system requests from the participant and the system receives from the participant geographic information about the location of the participant, such as the country and time zone of the participant. The geographic information is saved in the geographic information section 506 of the user record. In some embodiments, the system requests from the participant and the system receives from the participant additional location information, such as a street address or Global Positioning System (GPS) data, which is then stored in the geographic information section of the user records.

At step 406, the system requests from the participant and the system receives from the participant the participant's cell phone number as well as the country where the cell phone is used. This cell phone information is saved in the cell phone section 508 of the user record. In some embodiments, the system receives a description from the participant, such as "work cell phone" and saves the description to the cell phone section.

At step 408, the system requests from the participant and the system receives from the participant the join phone number for the phone at which the participant desires to be reached at the time of the conference call. This phone number is saved in the user record in the join phone section 510.

At step 410, system requests from the participant and the system receives from the participant the manner in which the participant wishes to join conference calls that the participant attends. The system provides the following call join options: (1) call the join phone number provided in section 510 of the user record when the organizer joins the conference call, (2) call the join phone number provided in section 510 of the user record a predefined amount of time before the conference call, e.g. 1 minute, 3 minutes, etc., (3) send a text message to the cell phone number provided in section 508 of the user record when the organizer joins the conference call, (4) send a text message to the cell phone number provided in section 508 a predefined amount of time before the call; and (5) user will initiate the connection to the conference call through the conference systems' website. Join processes are explained in further detail below. In some embodiments, the participant may also have the option of dialing into the conference using the tradition "meet me" conference by calling a predefined conference phone number and entering a conference code.

At step 412, the system requests from the participant and the system receives from the participant the manner in which the participant wishes to join conference calls when the participant is an organizer. In some embodiments, this option is only provide if the participant is pre-authorized as user capable of organizing conference calls. The system provides the following call join options: (1) call the join phone number provided in section 510 of the user record a predefined amount of time before the conference call, e.g. 1 minute, 3 minutes, etc., (2) send a text message to the cell phone number provided in section 508 of the user record a predefined amount of time before the call; (4) user will initiate the connection to the conference call through the conference systems' website.

In some embodiments, at step 414, the system sends the participant a verification email to the participant's email address in the email address section 502. The verification email contains a URL, which when activated in a web browser program will complete the verification process. When the verification process is complete the system will set the registered flag to true in the registered section 516.

In some embodiments, all the information of steps 402 through 412 are requested from the user on one webpage and receive when the user submits that information through the webpage.

Event Scheduling.

The conference system has an event scheduler function for scheduling calls to participants according to the participant's preselected call join preference as defined in the call join option sections 512, 514 of the corresponding user record. The event scheduler function creates event records 630 that are contained in an event table in the scheduling database 156. The event record 630 comprises a participant section 632, an action section 634 and a start date and time section 636. The participant section 632 contains the participant/user email address of the participant to which the event is related. The action section contains the action that is to occur, such as calling the user or texting the user. The start date and time section contains the start date and time when the event of the action section is to occur.

For example, if a conference call is to start at 1:00 pm on Jul. 20, 2012 as shown in FIG. 2 and the join option section 512 of the user record of one of the participants specifies that the participant is to receive a call one minute before the conference call is to start, then the event scheduler function will create an event record 630 having the participant's email address in the participant section 632, a call action and the participant's join phone number from the join phone number section 510 of the user record in the action section 634, and the start date and time being 12:59 pm on Jul. 20, 2012. As a further example, if a conference call is to start at 1:00 pm on Jul. 20, 2012 as shown in FIG. 2 and the join option section 512 user record of the participant specifies that the participant is to receive a text message one minute before the conference call is to start, then the event scheduler function will create an event record 630 having the participant's email address in the participant section 632, a text action and the participant's cell phone number from the cell phone number section 508 of the user record in the action section 634, and the start date and time of 12:59 pm on Jul. 20, 2012 in the start date and time section 636. As still a further example, if a conference call is to start at 1:00 pm on Jul. 20, 2012 as shown in FIG. 2 and the join option section 512 user record of the participant specifies that the participant is to receive a call when the organizer joins the conference call, then the event scheduler function will create an event record 630 having the participant's email address in the participant section 632, a call action and the participant's join phone number from the join phone number section 510 of the user record in the action section 634, the start date and time being triggered when the call organizer has joined the call. In some embodiments, the event record does not contain a phone number in the action section 634.

The event scheduler also updates event records when the date or time of a conference call is modified or cancelled, and when one or more sections of a user record are changed that impact a scheduled event, such as when the values in the join phone, the cell phone, or join options sections of the user record are changed.

Starting and Joining a Conference Call.

The conference system comprises an event execution function that continuously monitors and executes the events set forth in the event records 630 in the event table according the start date and time in the start date and time section 636 of each event record.

If an event record has a start date and time equal to that of the current date and time of the conferencing system, the event executor will begin to carry out the action defined in the action section of the event record. In the case where the event record specifies that the participant should be called or sent a text message when the organizer joins the conference call, the conference system is configured to monitor or otherwise be aware of when the organizer joins the conference call, such as by the conference bridge reporting to the conference server of the connection of the organizer to the call. Once the organizer joins the conference call, the event executor will begin to carry out the action defined in the action section of the event record.

If the action section specifies a call should be made and the action section does not contain the phone number to be called, the system retrieves the join phone number from the user records corresponding to the participant defined in the participant section 632 of the event record.

The system server directs the conference bridge 110 to dial the appropriate join phone number as shown in step 702 in FIG. 7, provided the specified participant is not already connected to the conference call. The system has a check participant connection function configured to report whether a given participant is connected to the conference call via the conference bridge. The system has a connection restriction function that limits the number of simultaneous connections that an individual participant may have to one connection regardless of the connection mechanism. If the participant is already connected to the call, the system will not allow another connection for that user. This feature provides a level of security to ensure that only those participants designated for the call have access to the call.

The participant answers the phone when it rings. At step 704, the conference system provides an audible instruction to the participant telling the participant to press a predefined number, such as the number 1, to join the conference. The conference system is capable of interpreting the touch tone sounds associated with the numbers pressed on the user's phone by a user. At step 706, when the conference system detects the user has pressed the predefined number, the system joins the participant into the conference call where the user will be able to hear all of the other participants currently on the conference call. The conference bridge 110 is capable of joining separate callers into a conference call as instructed by the conference server.

In some embodiments, the conference system is configured to recognize voice commands provided by the user. Therefore, the system may instruct the user to say a particular word or words, such as "join" to join the conference. Then the system will listen for an audio pattern matching a known audio pattern assigned with the particular word, such as "join."

If the action section of one event record specifies, in the action section 634, a text message should be sent and a phone number is not located in the action section 634, the system retrieves the cell phone number from the user record corresponding the participant defined in the participant section 632 of the event record. At step 802, the system server then directs the conference bridge 110 to send an electronic message, such as an SMS message, containing a conference URL to the cell phone of the participant. In some embodiments, the conference system provides directions via the network 118 to a third party messaging service that relays the message to the intended recipient according the a messaging protocol, such as the SMS messaging protocol.

The URL provided in the electronic message is a unique URL that when executed in a web browser program informs the web server 105 of the conference system of the participant corresponding to the URL. At step 804, when the participant receives the electronic message the participant selects the URL, which opens a corresponding webpage in a web browser of the user's internet enabled device. The webpage is served by the web server 105 of the conference system. The webpage allows the participant, at step 806 to (a) enter a phone number to be dialed to join the conference, or (b) select a previously used phone number from a list, such previously used phone numbers may include those defined in the join phone number section 511) of the user record. The system server then directs the conference bridge 110 to dial the appropriate join phone number provided the identified participant is not already connected to the conference call. The participant answers the phone when it rings at step 808. The system at steps 810 and 812 operates the same as at steps 704 and 706, respectively.

If the participant provides in the join options section(s) 512, 514 that the user will initiate the connection to the conference call through the conference systems' website, then the conference system will not schedule a call event for that participant. As shown in FIG. 9, the participant will go to the conference service's website at step 902. The conference system via the web server will check the device the participant is using to connect to the web server for a pre-existing HTTP secure authorization cookie. In some embodiments, the system is configured to place a secure authorization cookie on a user's device when the user register's as a new user or accepts an invitation to a conference call. A HTTP cookie is usually a small piece of data sent from a website, such as the website hosted by the server 105, to a user's electronic device when the user navigates to the website and the cookie is stored on the user's device for later access, retrieval, and/or update. If a secure authorization cookie is found identifying the participant, the system will present, via a web page, the user with one or more conference calls for which that participant is registered. Other authentication methods known in the art may also be used to authenticate the participant, such as authentication through use of a user name and password.

At step 904, the participant will select the conference the participant wishes to join. The system provides the participant with a webpage that allows the participant, at step 904, to (a) enter a phone number to be dialed to join the conference, or (b) select a previously used phone number from a list, such previously used phone numbers may include those defined in the join phone number section 511) of the user record. The system server then directs the conference bridge 110 to dial the appropriate join phone number. The participant answers the phone when it rings at step 908. The system at steps 910 and 912 operates the same as at steps 704 and 706, respectively.

In some embodiments, the conference system implements multi-factor authentication which requires the user participant to provide more than one form of verification in order to prove the participant's identity and allow access to the conference call. One type of multi-factor authentication that the conferencing system may utilize is a process verifying an access code generated on a security token held by the participant. In one embodiment, a security token is a device, such as an electronic device, that is issued by a third party provider. The security token changes a security code, such as an 8 digit number, displayed by the security token at regular intervals. The system requests a participant to enter the security code displayed on the security token. Then the system will interface with the third party security token provider, providing user information, the security code provided and the date and time the code was received. The third party will then send a message verifying whether or not security code provided by the user matches the security code, according to the third party provider's records, that was presented to the security token at the designated time for the user corresponding to the user information provided. In this way, the participant's identity can be further verified, because only the participant should be in possession of the security token.

Figure 14:
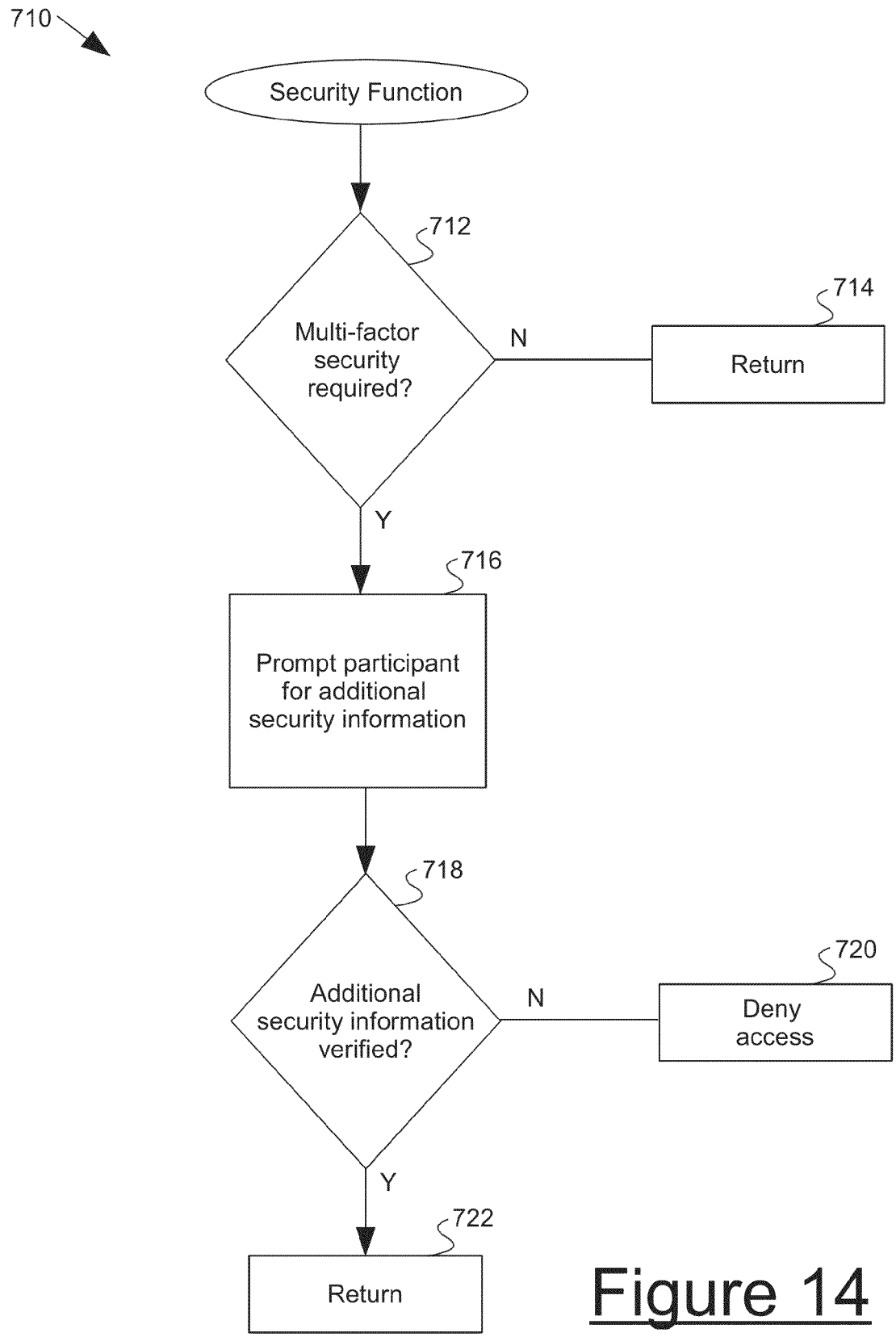
FIG. 14 is a flow diagram of a security function of one embodiment of the conference system.

As shown in FIG. 14, in some embodiments, the conferencing system has a security function 710. The security function determines the security level designated for a particular call at or before a conference call is to begin or at or before an event corresponding to an event record for a particular conference call is executed. For example, the system may be configured to call the security function 710 prior to steps 704, 810, 910. At step 712, the system determines whether multi-factor security is required for the participant's conference call. The determination may occur by checking a system level setting, or by reading a security section (not shown) of the event record 630 or calendar record 600. If the system determines that multi-factor authentication is not required for the participant's call, then the security function returns at step 714 to the process from which it was called and allows the user to join the call. For example, the security function may return to steps 704, 810, or 910. If the system determines that a call is designated as a multi-factor authentication call, then at step 716 the system will require the participant to enter or provide a security code, for example as provided by a security token, to the system. At step 718 the system will then verify that the security code provided is correct and corresponds to the participant. This step may involve interfacing with a third party security token provider. If the security code provided verifies as correct and corresponds to the participant, then at step 722 the security function will return to the process from which it was called and allow the user to join the call.

In some embodiments, the security code is requested by the system at step 806 and step 906. In some embodiments, the security code is requested after the system calls the user, such as at or after step 702, but before step 706. In such cases, the participant can enter the security code by dialing the appropriate digits on the participant's phone, which will be received by the system. In some embodiments, the system will request the security code at step 1118.

While the multifactor authentication has been described in terms of a security token, other forms of multi-factor authentication known in the art can be employed by the system to provide increased security. In some embodiments, instead of interfacing with an outside third party security token system provider, the conferencing system comprises an internal security token system.

Call-in Access Number Selection.

A conference call connection system is also disclosed. The conference call connection system may be implemented or carried out by the conference server 106 in communication with the conference bridge 110 of the conference system. The conference call connection system has a connection database 158 located on the computer storage medium 152. In some embodiments, the connection database is a connection table. The connection database 158 is configured to hold connection cost records 1001. While the conference call connection system is illustrated in reference to the conference system 102, it will be understood that the conference call connection system may be used with any conference system known in the art having components capable of carrying out the functions of the conference call connection system as explained below.

Under some telecommunication systems, each person that connects to a conference call is associated with two potential cost elements. The first component is the cost of the connection from the telephone access number to the conference bridge 110. This cost belongs to the conference service provider. The second component is the cost of the connection from an end user's telephone device to the telephone access number. This cost belongs to the end user or the end user's employer.

Each connection record has at least a telephone access number for receiving incoming calls from users seeking to join a conference, location information indicating location(s) where the telephone access number is considered a local number, and connection cost information indicating the cost of a user connecting to the conference system through the telephone access number.

In some embodiments, each connection cost record 1001 has a telephone number section 1002, a country code section 1004, a location section 1006, an SCC (System Connection Cost) landline section 1008, an SCC mobile section 1010, an EUC (End User Cost) landline same city section 1012, an EUC landline same country section 1014, an EUC landline different country 1016, an EUC mobile same city section 1018, an EUC mobile same country section 1020, and an EUC mobile different country 1022. In some embodiments the cost records has an in use section 1024 and the system updates the in use section when the telephone access number is allocated for use and when the number is fee when the conference call for which the telephone number was allocated is completed.

The telephone number section 1002 is configured to hold a telephone access number of the conference system with which a user can dial to access a conference through the conference bridge 110 or with which the system can dial out to a conference participant. The country code section 1004 is configured to contain the country or country code corresponding to the country from which the phone number contained in section 1002 originates. The location section 1006 is configured to contain the location information, such as Global Position System (GPS) information, corresponding to the location of the phone number in section 2002. For example, if the phone number in section 1002 is a phone number associated with a particular city, then section 1006 will contain the GPS coordinates corresponding to a location within that particular city, such as the geographic center of the city. As a further example, if the phone number located in section 1002 is associated with a particular country, then section 1006 will contain the GPS coordinates corresponding to a location within the particular country, such as the geographic center of the country. In some embodiments the GPS location data in section 1006 corresponds to a location within a local calling area corresponding to the phone number at section 1002 as designated by the telephone service provider.

It is known that certain components, such as an area code or a prefix, of a phone number can indicate the location from which the phone number originates. In some embodiments, the system determines the origination location of a phone number by components of the phone number.

The SCC landline section 1008 contains the conference service provider connection cost from telephone access number in section 1002 to the conference bridge when the end user is calling from a landline. The SCC mobile section 1010 contains the conference service provider connection cost from telephone access number in section 1002 to the conference bridge when the end user is calling from a mobile phone.

The EUC Landline Same City Section 1012 contains the cost for an end user to connect using a land line to the conference number in section 1002 when the user is located within the same city as the designated location, as provided in section 1006, of the conference number in section 1002. The EUC Landline Same County Section 1014 contains the cost for an end user to connect using a landline to the conference number in section 1002 when the user is located within the same county as the designated location, as provided in section 1006, of the conference number in section 1002. The EUC Landline Different County Section 1016 contains the cost for an end user to connect using a landline to the conference number in section 1002 when the user is located outside the county that corresponds to the designated location, as provided in section 1006, of the conference number in section 1002.

The EUC Mobile Same City Section 1018 contains the cost for an end user to connect using a mobile phone to the conference number in section 1002 when the user is located within the same city as the designated location, as provided in section 1006, of the conference number in section 1002. The EUC Mobile Same County Section 1020 contains the cost for an end user to connect using a mobile phone to the conference number in section 1002 when the user is located within the same county as the designated location, as provided in section 1006, of the conference number in section 1002. The EUC Mobile Different County Section 1022 contains the cost for an end user to connect using a mobile phone to the conference number in section 1002 when the user is located outside the county that corresponds to the designated location, as provided in section 1006, of the conference number in section 1002.

The conference call routing system may pre-populate the information in the connection cost records 1001 corresponding to each conference system telephone access number. The various sections of the connection cost record 1001 may be updated when cost information changes regarding the corresponding conference access number in the telephone number section 1002.

Figure 11:
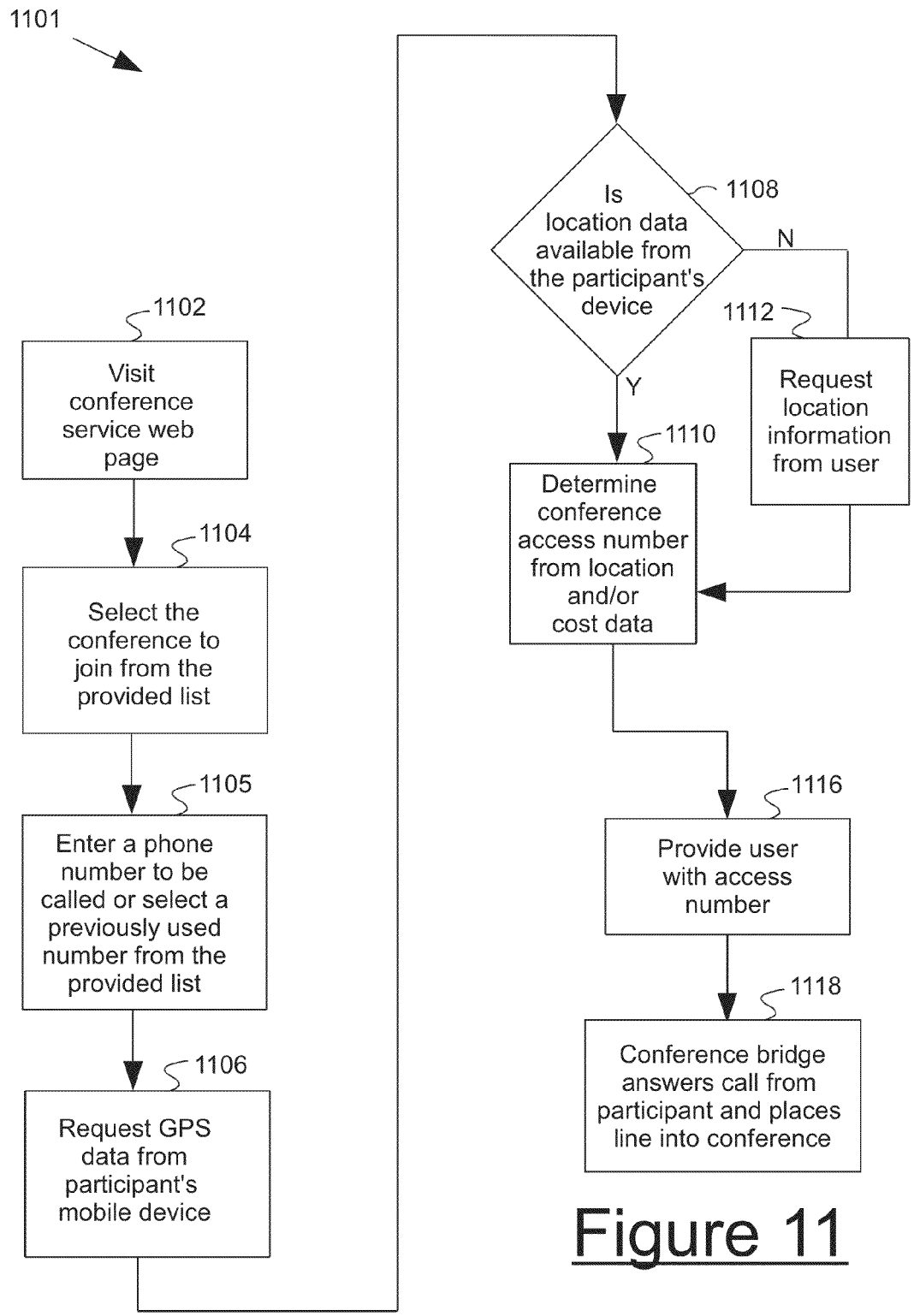
FIG. 11 is a flow diagram of an embodiment of a least cost access number selection process of an embodiment of the conference system.

An exemplary least cost access number selection process of determining the appropriate conference access number to be used for a particular participant is shown in FIG. 11. At step 1102, the user navigates to a webpage served by the web server 105 of the conference system. In some embodiments, the user provides authentication information to further access the conference system. In some embodiments, the authentication information is provided in the URL which is provided the user via an electronic message. The conference system then reads the authentication information via the web server 105 from the URL to which the user navigates. In some embodiments, at step 1104, the user selects the conference call that the user wishes to join from a list of available conferences. In some embodiments, the URL entered by the user is embedded with call information indicating the conference call to which the user is to join and the conferencing system reads the call information.

At step 1105 the participants enters or selects from a list of previously used phone number provided by the conference system, the phone number corresponding to the phone that the user will connect to the conference call from, such as the phone number in the join phone section 510 of the user record 500. The conference system receives the phone number selected or entered at step 1105.

In some embodiments, the conference system is configured to determine whether a phone number corresponds to a mobile phone or a landline. In some embodiments, conferencing system may request information from a third-party service provider whether a particular phone number corresponds to a mobile phone or a landline. If a phone number selected or entered by the user at step 1105 corresponds to a landline the system may skip step 1106 and go directly to step 1108 or step 1112. In some embodiments, the system will request that the user specify whether a phone number is a mobile phone number or a landline. In some embodiments, the system will know that a selected phone number corresponds to a mobile phone if the user already provided that information to the system such as by defining a mobile phone number which the system then placed in cell phone section 508 of the user record 500.

In some embodiments, the conference system is configured to detect the type of device that the user has connected to the conferencing system with at steps 1102, 1104, and/or 1105, such as by reading information provided by the user's browser which is generally sent to web servers when accessing webpages. If the conferencing system determines that the user has connected to the conferencing system at step 1102, 1104, and or 1105 with a device, such as a desktop computer, that does not have location providing capabilities, such as GPS capabilities, the system may skip step 1106 and go directly to step 1108 or 1112.

The system requests user location data, such as GPS data, city, state, and country data, or street address data, at step 1106 from the user's mobile device, such as devices 120, 124 or 125, 129. The user's device may be configured to request the user's permission before providing the GPS data corresponding to the location of the user's device at the time of the request. At step 1108, the system determines whether it has received location data from the user's device. If the user grants permission to provide the conferencing system with the GPS data, or if the GPS data is otherwise provided to the system, the conference system will receive the GPS data and proceed to step 1110. If at step 1108, the system determines that it did not receive location information from the user's device, the system then proceeds to step 1112.

At step 1112, the conferencing system requests location information about the location of the user. This location information may include street address information, or city, state/province information, country information, GPS coordinate information, or other location information. The location of the user at or about the time of the conference call will generally accurately reflect location of either the land line phone from which the user will connect to the call or the user's mobile device at the time of the call.

In some embodiments, instead of requesting information from a user or in addition to requesting such information, in the case where the user indicates a phone number at step 1105 that corresponds to a landline, the conferencing system may attempt to determine the location of the user based on attributes of the phone number provided at step 1105. Such attributes of the phone number may include a country code, an area code, a prefix, or other like attribute. Based on the country code, the area code, or the prefix, or other attributes of the phone number, the system may be able to determine the general location of the user. The system may be pre-programmed or may access a database providing a geographic location correlation to various phone number attributes such country code, the area code, the prefix, or other attributes of the phone number. However, the step of determining a location of the user based on attributes of the phone number will not generally be used when the phone number is a mobile phone number, because mobile phone numbers may move with the user throughout an unknown geographic area of service.

At step 1110, the conference system selects from the connection database 158, a phone number for the user to use to connect to the conference call. In some embodiments, the phone number is selected from section 1002 corresponding to a record 1001 having location information in the location section 1006 that is geographically closest to the user location data received from the user's mobile device at step 1106. The conference system does this by comparing the user location data received from the user's mobile device at step 1106 to the location information and locations section 1006 of one or more records 1001, and preferably all of the records, in the connection database 158. In some embodiments, the system is configured to select an access phone number having a location in the location section 1006 that is geographically closed to the user location, even if the access phone number is in a different country than the user's location.

Figure 12:
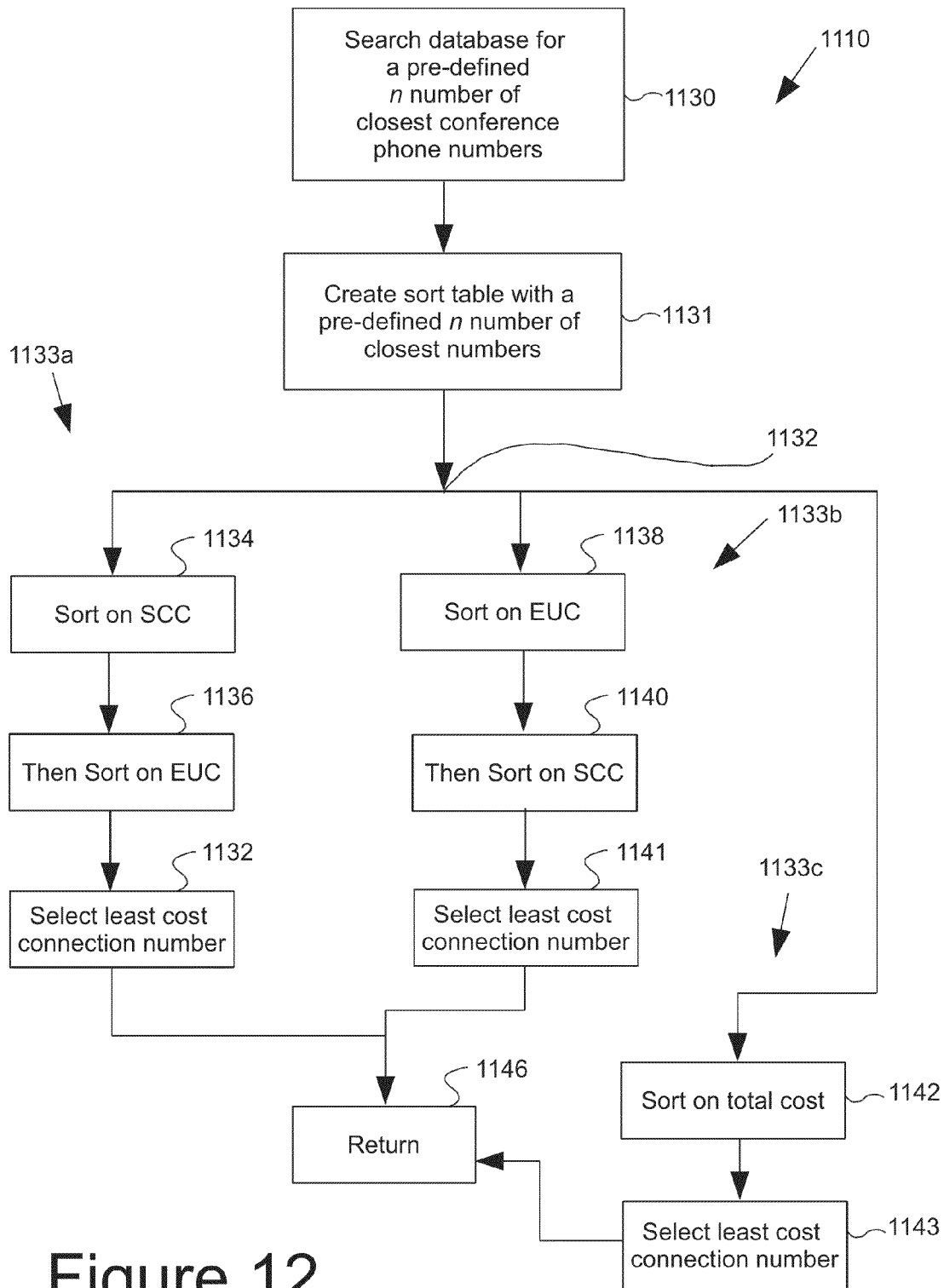
FIG. 12 is a flow diagram of a portion of the least cost access number selection process of FIG. 11.

In some embodiments, the phone number is selected from the connection database 158 at step 1110 as shown in FIG. 12. FIG. 12 shows that step 1110 may comprise a number of additional steps. At step, 1130, the conferencing system scans one or more, and preferably all of the records, in the connection database 158. While scanning the database 158, a conferencing system selects a predefined n number of records 1001 from the database 158, where each of the n records having location information in the location section 1006 that correspond to the n geographically closest locations to the user location data such as the user location data received from the user's mobile device at step 1106. In some embodiments, n is equal to 5. At step 1132, the selected it number of records may be placed in a sort table and sorted under one or more selection algorithms to determine the conference call access number to be provided to the user from among the n number of records.

At branch 1132, three different routes 1133a, 1133b, 1133c are provided showing three different embodiments of the sorting algorithm. It will be appreciated that the conferencing system in each embodiment will be configured to follow one of the respective routes 1133a, 1133b, or 1133c depending on the embodiment.

In the embodiment represented by route 1133a, the system selects a conference call connection phone number based on which access number will incur the least cost to the conference service from a connection from a participant. Route 1133a also provides an optional secondary selection function operable when two or more phone numbers have the same cost to the conference service. In the case where two or more phone numbers have the same cost the conference service, the secondary selection function will select among those having the same cost, a phone number that produces the least cost for the end user to connect. In some embodiments, the system uses sort functions to achieve the selection.

In step 1134 the system provides a primary sort function that sorts the sort table based on the cost to the conference service or the SCC (System Connection Cost). In the case the user has entered or selected a mobile phone number at step 1105, then the records 1001 in the short table are sorted based on the cost values provided in the SCC mobile section 1010 of each record. In the case that the user has entered or selected a landline phone number at step 1105, then the records 1001 in the short table are sorted based on the cost values provided in the SCC landline section 1008 of each record.

At step 1136, system provides an optional secondary sort function that sorts the sort table based on the End User cost to connect. The secondary sort function only sorts records where value in the SCC section is the same between one or more records 1001 having the same value in the SCC section. In the case the user has entered or selected a mobile phone number at step 1105, then the records 1001 in the short table are secondary sorted based on the cost values provided in the appropriate EUC mobile sections 1018, 1020, 1022. If the location of the user is in the same city as the phone number in section 1002 of a given record 1001 in the sort table, then the value in EUC Mobile Same City Section 1018 is used by the secondary sort function for that record. If the location of the user is in the same country, but not the same city, as the phone number in section 1002 of a given record 1001, then the value in EUC Mobile Same County Section 1020 is used by the secondary sort function for that record. If the location of the user is in a different county from the country of the phone number in section 1002 of a given record 1001, then the value in EUC Mobile Different County Section 1022 is used by the secondary sort function for that record. In the case the user has entered or selected a landline phone number at step 1105, then the records 1001 in the short table are secondary sorted based on the cost values provided in the appropriate EUC landline sections 1012, 1014, 1016 of each record. The determination of which of values from the EUC landline section 1012, 1014, 1016 is to be used, is determined in the same way as just described with respect to selecting values from sections 1018, 1020, 1022.

If both of the primary sort function and the secondary sort function sort in ascending order, then the telephone access number of the first record in the sort table provide the least cost connection for the conferencing system, and if there is more than one number providing the same least cost connection for the conferencing system, then among those numbers, the first number of the first record is the number with the least cost to the end user. The number of the first record from the sort table is selected at step 1137 and returned at step 1146 to the process of FIG. 11 and thereby proceeds to step 1116.

In the embodiment represented by route 1133b, the system selects a conference call connection phone number based on which access number will incur the least cost for the end user to connect to the conference call. Route 1133b also provides an optional secondary selection function operable when two or more phone numbers have the same cost to the end user. In the case where two or more phone numbers have the same cost the end user, the secondary selection function will select among those numbers having the same connection cost, a phone number that produces the least cost to the conference system. In some embodiments, the system uses sort functions to achieve these results.

The route 1133b provides an embodiment where the secondary sort function described regarding step 1136 is the primary sort function at step 1138. Further the primary sort function described regarding step 1134 is the optional secondary sort function at step 1140. If both of the primary sort function and the secondary sort function sort in ascending order, then the telephone access number in the first record in the sort table provide the least cost connection for the end user, and if there is more than one number providing the same least cost connection for the user, then among those numbers, the access number of the first record is the number with the least cost to the conferencing system. The number of the first record from the sort table is selected at step 1141 and returned at step 1146 to the process of FIG. 11 and thereby proceeds to step 1116.

In the embodiment represented by route 1133c, the system selects a conference call connection phone number based on that least total connection cost incurred for the connection. The least total cost considers both the conferencing system connection cost and the end user connection cost. In one embodiment, the system uses sort functions to achieve these results.

The route system under 1133c calculates the total connection cost for each record in the sort table. The total connection cost comprises the sum of the cost to the conferencing system and the cost to the end for connecting a participant. First, as explained above with respect to step 1134, based on whether the user has entered are selected a mobile or landline, the appropriate cost value from either the SCC landline section 1008 or the SCC mobile section 1010 retrieved for each record. Next, as explained above with respect to step 1136, the cost value provided in one of section 1012 through section 1022 is selected and returned for each record depending on whether (a) the user has entered are selected a mobile or landline and (b) the location of the user relative to the location as provided in section 1006 of the conference telephone access number provided in section 1002. After the combined connection cost is determined for each of the records in the sort table, the records in the table are sorted in ascending order at step 1142. The phone number corresponding to the least total connection costs is chosen at step 1143 by the system and returned at step 1146 to the process of FIG. 11 and thereby proceeds to step 1116.

While the forgoing process for selecting the least cost conference call access phone number has been explained using a sort table, one skilled in the art will recognize that many other processes may be implemented to achieve the selection of the least cost conference call phone number for a particular participant. For example, instead of creating a temporary sort table, in some embodiments the system may be configured analyze and select numbers corresponding to records 1001 directly from the database 158. Further in some embodiments, the system need not sort the results but instead will select the appropriate phone number directly from the database 158.

Figure 13:
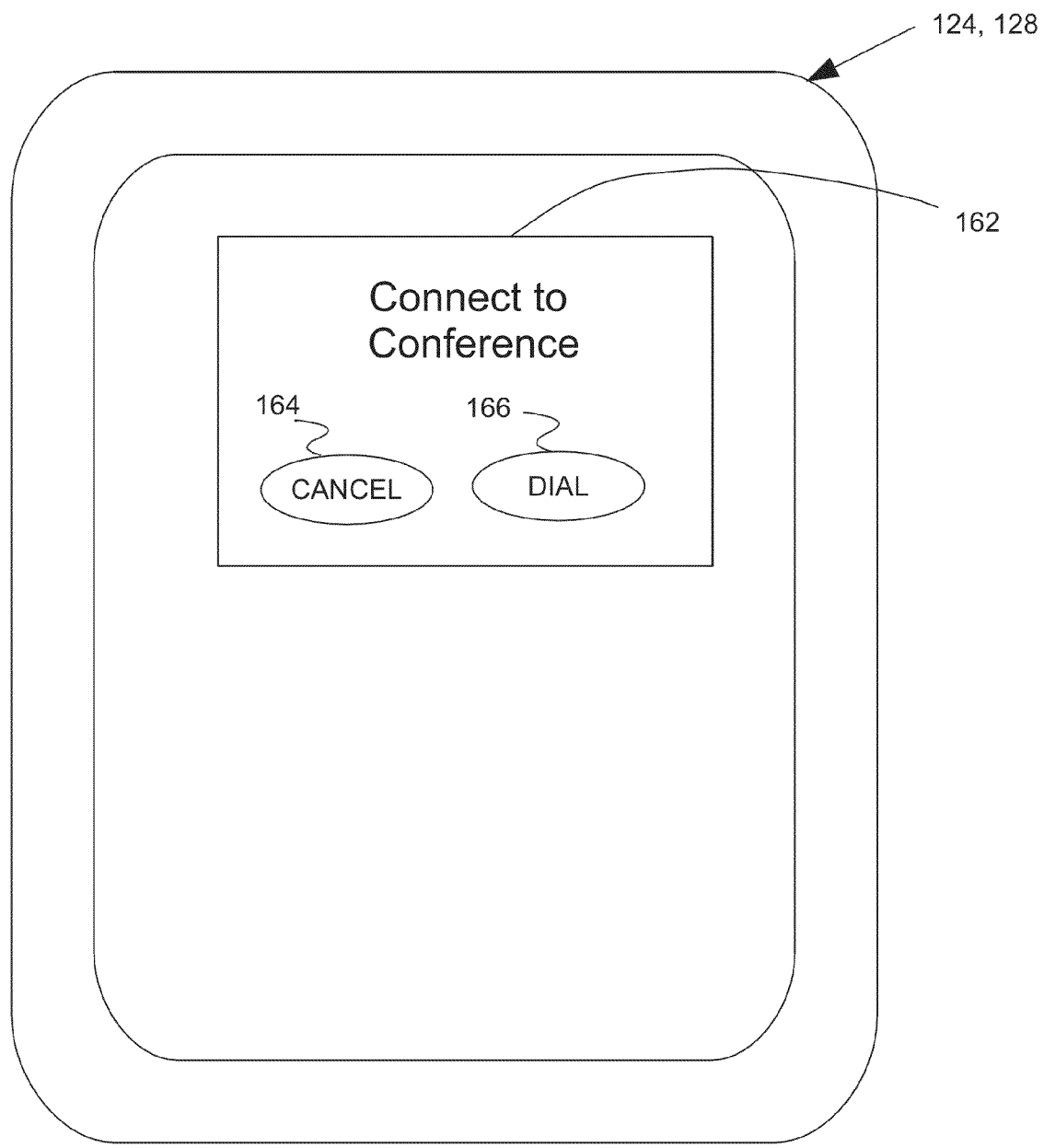
FIG. 13 is an exemplary mobile device of a user with a display shown an option to connect to a conference call.

At step 1116, the access phone number selected by the system at step 1110, is sent to the user. If the user has a mobile device capable of making phone calls, the system will send the phone number in a format configured to be recognized as a phone number by the user's mobile device. The user's mobile device may then present the user the option to dial the phone number provided by the conference system, such as shown in FIG. 13.

In some embodiments, the format provided by the system to the user's mobile device is such that the mobile device will recognize it as a phone number. One example of a user device 124, 128 is shown in FIG. 13. The device when receiving the phone number from the conference system will present the user with a window 162 in which the user is given the option of selecting to dial into the conference call by selecting "dial" 166 or to ignore the conference call by selecting "cancel" 164. In the case where the user's device has a touch screen, the user may be able to touch the word "dial" as presented by the device and the device will dial the phone number provided by the conference system. The ability of the user to dial the conference number with one action increases the ease of using the conference system as compared to a requirement where the user must type in the phone number to begin the call.

One format that may enable a user's device to recognize a number as a phone number is the following HTML syntax <a href="tel:+13098455555">Connect to (Conference</a>. A user's mobile device may be configured to recognize that the number following the "tel:" is the phone number 1-309-845-5555 from the forgoing HTML syntax. In some embodiments, the phone number can be provided to the user's device in a format that the phone will recognize as a phone number and will therefore present the user with the option of activating the phone function of the user's device to call the phone number, such as disclosed in U.S. Pat. No. 5,946,647.

In some embodiments, the conferencing system provides the user with a unique conference call access code along with the conference call phone number at step 1116. The unique conference call access code is unique to the person connecting and has a limited effective lifetime within which it will be effective. The limited effective lifetime is usually until the end of the conference call, but can be other periods of time. This prevents users from providing the information to other parties not invited to the conference call.

The conference call access code may be embedded in a format recognizable by the phone so that the access number is automatically dialed by the phone after the phone number is dialed. One example format is the following HTML syntax <a href="tel:+13098455555,,,123456#">Connect to Conference</a>. When activated by the user, this will cause the user's phone to dial the number 1-309-845-5555, then to wait a predefined amount of time, and then to dial the access code of 123456#. If the system detects that the user's device is a mobile phone, but that it is not a smartphone, the system can send the conference access phone number and access code in a text format via SMS message, or other electronic message transmission protocol, to the user's phone or email address.

The user then dials the phone number provided by the system to access a conference. Then at step 1118 the conference bridge answers the call from the user. The conference bridge optionally receives a conference call access code from the user device. The system authenticates the participant and directs the conference bridge to places the caller into the appropriate conference call.

In the case where the user is using a device that does not have telephone functionality, the user may take the phone number provided by the conference system and dial into the conference manually. In the case that an access code is required, the user can manually enter the access code when prompted by the conference system. After the conference system authenticates the participant, the conference server will direct the conference bridge to join the caller into the appropriate conference call.

In some embodiments, the system is configured to send the user an SMS text message a certain number of minutes prior to the call, where the message contains a URL. When selected or when entered into a browser, the URL directs the user to step 1105. The pre-formatted URL may contain authentication information identifying the user and the conference call to be joined.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A method of conference calling, comprising the steps of:
receiving via a conference resource email address, a conference call request email on a system server, the conference call request email comprising user-entered conferencing information, the user-entered conferencing information comprising calendar information, and an email address of one or more participants, and the conference resource email address;
determining whether each of the one or more participants is a system user by querying a user database, the user database having telephone contact information and an electronic address for each system user; and,
scheduling a conference call on the system server between the one or more participants according to the calendar information in the conference call request email.

2. The method of claim 1, wherein the step of scheduling a conference call, is further defined in that only participants that are system users are scheduled for the conference call.

3. The method of claim 1, comprising the step of:
inviting each participant that is not a system user to become a system user by the participant submitting at least telephone contact information of the participant.

4. The method of claim 1, comprising the steps of:
registering a participant that is not a system user as a system user by:
sending the participant an electronic message to the electronic address of the participant, the electronic message having connection information for connecting to a user registration page;
confirming an identity of the participant through the use of said connection information;
receiving telephone contact information from the participant,
storing the telephone contact information associated with the electronic address of the participant in the user database.

5. The method of claim 4, wherein the step of sending is further defined in that the connection information comprises a unique identifier corresponding to the participant; and wherein the step of confirming is further defined in that the identity of the participant is confirmed through the unique identifier.

6. The method of claim 4, wherein the step of sending is further defined in that the connection information is a URL having a time-limited validity and comprising a unique identifier corresponding to the participant, and wherein the step of confirming is further defined in that the identity of the participant is confirmed through the unique identifier.

7. The method of claim 1, comprising the steps of:
starting the conference call by the system server instructing a conference bridge connected to a telephone network to dial the telephone contact information of one or more of the participants that are a system users; and
joining, through the conference bridge, calls received from the one or more participants to the conference call.

8. The method of claim 1, comprising the steps of:
starting the conference call by the system server instructing the dialing, at or before a conference call start time, of the telephone contact information of one or more of the participants that are a system user at a time of the dialing, wherein the calendar information comprises the conference call start time; and
joining the one or more participants to the conference call.

9. The method of claim 1, comprising the steps of:
receiving a request from at least one participant, of the one or more participants, that is a system user, to access a conference call start page;
receiving from the at least one participant a participant phone number for connecting to the conference call;
dialing the participant phone number through a conference bridge connected to a telephone network according to instructions from the system server; and
joining, through the conference bridge, the at least one participant into the conference call.

10. The method of claim 9, comprising the step of,
before receiving a request from the at least one participant, sending one or more participants a conference start electronic message prior to a conference call start time, the conference start electronic message having connection information for connecting to the conference call start page; and
wherein the step of receiving a request from the at least one participant, of the one or more participants, comprises the step of receiving a request from the at least one participant to access the conference call start webpage corresponding to the connection information.

11. The method of claim 9, comprising the steps of,
after receiving a receiving a request from the at least one participant to access a conference call start webpage, determining whether the participant is authorized to access the conference call corresponding to the conference call start page;
serving to the participant the conference call start page only if the participant is authorized to access the conference call corresponding to the conference call start page.

12. The method of claim 1, wherein in the step of receiving is further defined in that the conferencing information is in an iCalendar format.

13. The method of claim 1, comprising the step of,
after receiving a conference call request email on a conference call server, determining whether a sender of the conference call request email is authorized to schedule conference calls by querying the user database; and,
wherein the step of scheduling a conference call on the conference call server, is further defined in that the conference call is only scheduled if the sender is authorized to schedule conference calls.

14. A system of conference calling, comprising:
a computer system comprising,
a processor, and
a memory signal connected to the processor, the memory having at least one user record associated with each system user, the user record comprising, telephone number and an electronic address for each system user;
a conference call request receiving function executable by the processor to receive, via a conference resource email address, a conference call request email, the conference call request email comprising user-entered conferencing information, the user-entered conferencing information comprising calendar information, and an email address of one or more participants, and the conference resource email address;
a participant authentication function executable by the processor to determine whether each of the one or more participants is a system user by querying a user database, the user database having a telephone number and an electronic address for each system user; and,
a scheduling function executable by the processor to schedule a conference call on computer system between the one or more participants according to the calendar information in the conference call request email.

15. The system of claim 14, wherein the scheduling function only schedules the conference call between participants that are system users.

16. The system of claim 14, comprising a user registration function executable by the processor to register participants that are not system users as system users, the user registration function comprises,
a send registration request function executable by the processor to send the participant an electronic message to the electronic address of the participant, the electronic message having connection information for connecting to a user registration page;
an identity confirmation function executable by the processor to confirm an identity of the participant through the use of said connection information;

an information receiving function executable by the processor to receive telephone number from the participant;

a information storage function executable by the processor to store the telephone number associated with the electronic address of the participant in the user database.

17. The system of claim 16, wherein the connection information sent by the send registration request function comprises a unique identifier corresponding to the participant; and wherein the identity confirmation function is executable to confirm the identity of the participant through the use of the unique identifier.

18. The system of claim 14, comprising:

a start conference call function executable by the processor to dial, at or before a conference call start time, the telephone number of one or more of the participants that are a system user at a time of the dialing, wherein the calendar information comprises the conference call start time; and a join call to conference function executable by the processor to join the one or more participants to the conference call.

19. The system of claim 18, wherein the computer system comprises a conference call bridge in signal communication with the processor, the conference call bridge configured to connect with a telephone network and to join calls into one or more conference calls.

20. The system of claim 14, comprising:

a conference call bridge in signal communication with the computer system, the conference call bridge configured to connect with a telephone network;

a start conference call function executable by the processor to instruct the conference bridge to dial the telephone number of one or more of the participants that are a system users at a time of the dialing, wherein the calendar information comprises the conference call start time; and a join call to conference function executable by the conference bridge to join one or more calls of the one or more participants to the conference call, where calls of the one or more participants are received by the conference bridge from the telephone network.

21. The system of claim 14, comprising, a start conference call function executable by the processor to, receive a request from at least one participant that is a system user to access a conference call start page;

receive from the participant a participant phone number for connecting to the conference call;

dial the participant phone number, and join the participant into the conference call.

22. The system of claim 19, the start conference call function executable by the processor to, send one or more participants a conference start electronic message prior to a conference call start time, the conference start electronic message having connection information for connecting to the conference call start page; and receive a request from at least one participant to access the conference call start webpage corresponding to the connection information.

23. The system of claim 14, comprising a organizer authentication function executable by the processor to determining whether a sender of the conference call request email is authorized to schedule conference calls by querying the user database; and, wherein the a scheduling function is further defined in that scheduling only occurs if the sender is authorized to schedule conference calls.

24. A system of conference calling, comprising:

a conference call server comprising, a processor, and a memory signal connected to the processor, the memory comprising a user database, the user database having at least one user record associated with each system user, the user record comprising a telephone number and an electronic address for each system user;, a conference bridge signal connected to the conference call server, the conference bridge configured to connect with a telephone network;

a conference call request receiving function stored on the memory and configured to receive, via a conference resource email address, a conference call request email, the conference call request email comprising user-entered conferencing information, the user-entered conferencing information comprising calendar information, and an email address of one or more participants, and the conference resource email address;

a participant authentication function stored on the memory and configured to determine whether each of the one or more participants is a system user by querying the user database, the user database having a telephone number and an electronic address for each system user, a scheduling function stored on the memory and configured to schedule a conference call on the conference call server between the one or more participants according to the calendar information in the conference call request email;

a start conference call function stored on the memory and configured to instruct the conference bridge to dial, at or before a conference call start time, the telephone number of one or more of the participants that are a system user at a time of the dialing, wherein the calendar information comprises the conference call start time; and, a join call to conference function stored on the memory and configured to instruct the conference bridge to join calls from the one or more participants to the conference call.

25. The method of claim 1, comprising the steps of: after the step of receiving, scanning the conference call request email for one or more code fields;

extracting the data associated with the one or more code fields;

storing in a database, the extracted data related to a conference call organizer that sent the conference call request email;

providing the extracted data along with usage information associated with the conference call organizer to a billing system.

26. The method of claim 25, wherein the one or more code fields corresponds to a user billing code or user client code.

27. The system of claim 1, comprising the steps of:

starting the conference call by receiving on a conference bridge a call from a participant or by the system server instructing the dialing, at or before a conference call start time, of the telephone contact information of one or more of the participants that are a system user at a time of the dialing, wherein the calendar information comprises the conference call start time;

determining a security level of a conference call by querying a security database;

prompting the participant for additional security information required by the security level;

receiving the additional security information from the participant;

verifying the additional security information with an authentication system;

storing the verification response from the authentication system in the security database;

joining the participant to the conference call if the verification response indicates the additional security information was authenticated.

28. The method of claim 1, wherein the step of receiving comprises the step of receiving the calendar information in an email generated by calendar program of a sender of the conference call request email, where the calendar program has email functionality for scheduling meetings.

29. The method of claim 1, comprising the steps of, before the step of receiving via a conference resource email address, a conference call request email on system server, receiving the user-entered conferencing information, comprising the calendar information, and the email address of one or more participants, and the conference resource email address, into a meeting invitation form in a calendar software on a first computing device of the user, generating a meeting invitation with the conferencing information; and, sending the meeting invitation in the conference call request email to at least the conference resource email address.

30. The method of claim 1, comprising the steps of:

receiving, via the conference resource email address, a conference call modification request email on the system server, the conference call modification request email comprising a request to modify at least one item of the user-entered conferencing information related to the conference call that has already been scheduled;

modifying the conference call according to the conference call modification request email.

31. The method of claim 30, wherein the step of receiving is further defined in that said at least one item of the user-entered conferencing information comprises at least one of a conference call start date, a conference call start time, a conference call end date, a conference call end time, or a participant.

32. The system of claim 14, comprising a conference call modification function executable by the processor to receive, via the conference resource email address, a conference call modification request email on the system server, the conference call modification request email comprising a request to modify at least one item of the user-entered conferencing information related to the conference call that has already been scheduled, and to modify the conference call according to the conference call modification request email.

33. The system of claim 32, wherein the at least one item of the user-entered conferencing information comprises at least one of a conference call start date, a conference call start time, a conference call end date, a conference call end time, or a participant.

* * * * *